US012213008B2

(12) United States Patent
Zhang et al.

(10) Patent No.: US 12,213,008 B2
(45) Date of Patent: Jan. 28, 2025

(54) DISCONTINUOUS RECEPTION OPERATION FOR SIDELINK COMMUNICATIONS

(71) Applicant: QUALCOMM Incorporated, San Diego, CA (US)

(72) Inventors: Xiaoxia Zhang, San Diego, CA (US); Chih-Hao Liu, San Diego, CA (US); Yisheng Xue, San Diego, CA (US); Jing Sun, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 17/313,654

(22) Filed: May 6, 2021

(65) Prior Publication Data

US 2022/0361049 A1    Nov. 10, 2022

(51) Int. Cl.
*H04W 28/26* (2009.01)
*H04L 1/08* (2006.01)
*H04W 72/20* (2023.01)
*H04W 76/28* (2018.01)

(52) U.S. Cl.
CPC .............. *H04W 28/26* (2013.01); *H04L 1/08* (2013.01); *H04W 72/20* (2023.01); *H04W 76/28* (2018.02)

(58) Field of Classification Search
CPC ..... H04W 28/26; H04W 76/28; H04W 72/20; H04L 1/08
See application file for complete search history.

(56) References Cited

U.S. PATENT DOCUMENTS

2022/0191851 A1\* 6/2022 Park ...................... H04L 1/1896
2022/0217740 A1\* 7/2022 Park ...................... H04L 1/1848
(Continued)

FOREIGN PATENT DOCUMENTS

WO    WO-2021080240 A1    4/2021

OTHER PUBLICATIONS

Fujitsu, Discussion of HARQ RTT and Retransmission timer for SL DRX, 3GPP TSG RAN WG2 Meeting #113bis electronic, Online, Apr. 12-Apr. 20, 2021, R2-2103287 (Year: 2021).\*
(Continued)

*Primary Examiner* — Joseph A Bednash
(74) *Attorney, Agent, or Firm* — Holland & Hart LLP

(57) ABSTRACT

Methods, systems, and devices for wireless communications are described. In some wireless communications systems, a user equipment (UE) may receive control signaling indicating a configuration for performing a sidelink discontinuous reception procedure, where the configuration indicates a duration of a timer associated with an active duration for the first UE to receive sidelink retransmissions during the sidelink discontinuous reception procedure. The UE may then receive a first sidelink communication including data and may, in some cases, transmit feedback requesting a retransmission of the data. The UE may then receive second sidelink communication including the retransmitted data. Prior to receiving the second sidelink communication including the retransmitted data, the UE may initiate the timer according to the configuration. Thus, the UE may be in an active mode to receive the second sidelink communication.

20 Claims, 18 Drawing Sheets

(56) References Cited

U.S. PATENT DOCUMENTS

2023/0014303 A1* 1/2023 Di Girolamo ........ H04W 72/20
2023/0164768 A1* 5/2023 Park ................... H04W 72/566
370/329

OTHER PUBLICATIONS

InterDigital Inc. "Further Details on SL DRX Timers", 3GPP RAN WG2 Meeting #113bis electronic, Online, Apr. 2021, R2-2102802 (Year: 2021).*

OPPO, "Left issues on DRX mechanisms and granularity", 3GPP TSG-RAN WG2 #113bis-e, E-meeting, Apr. 2021, R2-2102888 (Year: 2021).*

LG Electronics, "Discussion on physical layer design considering sidelink DRX operation", 3GPP TSG RAN WG1 #103-e, E-Meeting, Oct. 26-Nov. 13, 2020, R1-2007897 (Year: 2020).*

Interdigital Inc: "Discussion on Uu DRX for SL UE", 3GPP RAN WG2 Meeting #112 electronic, 3GPP Draft, R2-2009211, Online, 3rd Generation Partnership Project (3GPP), Mobile Competence Centre, 650, Route Des Lucioles, F-06921 Sophia-Antipolis Cedex, France, vol. RAN WG2, No. electronic, Nov. 1, 2020, 3 Pages, Nov. 2020, XP051942218, Oct. 22, 2020 (Oct. 22, 2020), Retrieved from the Internet: URL: https://ftp.3gpp.org/tsg_ran/WG2_RL2/TSGR2_112-e/Docs/R2-2009211.zip R2-2009211 (R17 SL Enh WI_A8152 UL DRX).doc [retrieved on Oct. 22, 2020] the whole document.

International Search Report and Written Opinion—PCT/US2022/022903—ISA/EPO—Jun. 30, 2022.

LG Electronics: "Discussion on Physical Layer Design Considering Sidelink DRX Operation", 3GPP TSG RAN WG1 #103-e, 3GPP Draft, R1-2007897, 3rd Generation Partnership Project (3GPP), Mobile Competence Centre, 650, Route Des Lucioles, F-06921 Sophia-Antipolis Cedex, France, vol. RAN WG1, No. E-Meeting, Oct. 26, 2020-Nov. 13, 2020, Oct. 24, 2020 (Oct. 24, 2020), 16 Pages, XP051946545, Retrieved from the Internet: URL: https://ftp.3gpp.org/tsg_ran/WG1_RL1/TSGR1_103-e/Docs/R1-2007897.zip, R1-2007897 Discussion on physical layer design considering sidelink DRX operation_LGE.docx [retrieved on Oct. 24, 2020], paragraph [02.1]-paragraph [2.10].

LG Electronics Inc (Rapporteur): "Remaining V2X MAC Issues", 3GPP TSG RAN WG2 #109-e, 3GPP Draft, R2-2003524, 3rd Generation Partnership Project (3GPP), Mobile Competence Centre, 650, Route Des Lucioles, F-06921 Sophia-Antipolis Cedex, France, vol. RAN WG2, No. Online, Apr. 20, 2020-Apr. 30, 2020, Apr. 10, 2020 (Apr. 10, 2020), XP051871449, Retrieved from the Internet: URL: https://ftp.3gpp.org/tsg_ran/WG2_RL2/TSGR2_109bis-e/Docs/R2-2003524.zip , R2-2003524 Remaining V2X Mac Issues.doc [retrieved on Apr. 10, 2020] pp. 1-3, pp. 10, 11.

* cited by examiner

DISCONTINUOUS RECEPTION OPERATION FOR SIDELINK COMMUNICATIONS

FIELD OF TECHNOLOGY

The following relates to wireless communications, including discontinuous reception operation for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support discontinuous reception operation for sidelink communications. That is, a user equipment (UE) may communicate with another UE during a sidelink discontinuous reception procedure, where the UE transitions between active durations (e.g., where the UE is monitoring for sidelink communications) and inactive durations (e.g., where the UE refrains from monitoring for sidelink communications). In some cases, the active durations for the UE (e.g., during the discontinuous reception procedure for sidelink communications) may be defined based on a timer. For example, the UE may enter into an active duration in response to initiating the timer and may transition into the inactive duration based on an expiration of the timer. Generally, the described techniques provided for sidelink discontinuous reception procedure configurations that indicate a duration of a timer (e.g., associated with an active duration for the UE) such that the UE is in an active duration to receive retransmissions of data from another UE as part of the sidelink discontinuous reception procedure.

In some instances, the configuration for the sidelink discontinuous reception procedure (and corresponding configuration for the timer) may be based on the type of the sidelink discontinuous reception procedures (e.g., a sidelink discontinuous reception procedure associated with a sidelink resource reservation procedure, a sidelink discontinuous reception procedure associated with receiving identifiers that identify UEs in sidelink communications, a sidelink discontinuous reception procedure associated with blind retransmissions).

A method for wireless communication at a first user equipment (UE) is described. The method may include receiving control signaling indicating a configuration for performing a sidelink discontinuous reception procedure that is associated with a sidelink resource reservation procedure, where the configuration indicates a duration of a timer associated with an active duration for the first UE to receive sidelink retransmissions during the sidelink discontinuous reception procedure, receiving, from a second UE, a first sidelink communication including data based on receiving the control signaling indicating the configuration for performing the sidelink discontinuous reception procedure, transmitting, to the second UE, feedback requesting a retransmission of the data based on receiving the first sidelink communication, initiating the timer in response to transmitting the feedback based on receiving the first sidelink communication, and receiving, based on initiating the timer, a second sidelink communication including the retransmission of the data, the second sidelink communication received via resources associated with the sidelink resource reservation procedure.

An apparatus for wireless communication at a first UE is described. The apparatus may include a processor, memory coupled with the processor, and instructions stored in the memory. The instructions may be executable by the processor to cause the apparatus to receive control signaling indicating a configuration for performing a sidelink discontinuous reception procedure that is associated with a sidelink resource reservation procedure, where the configuration indicates a duration of a timer associated with an active duration for the first UE to receive sidelink retransmissions during the sidelink discontinuous reception procedure, receive, from a second UE, a first sidelink communication including data based on receiving the control signaling indicating the configuration for performing the sidelink discontinuous reception procedure, transmit, to the second UE, feedback requesting a retransmission of the data based on receiving the first sidelink communication, initiate the timer in response to transmitting the feedback based on receiving the first sidelink communication, and receive, based on initiating the timer, a second sidelink communication including the retransmission of the data, the second sidelink communication received via resources associated with the sidelink resource reservation procedure.

Another apparatus for wireless communication at a first UE is described. The apparatus may include means for receiving control signaling indicating a configuration for performing a sidelink discontinuous reception procedure that is associated with a sidelink resource reservation procedure, where the configuration indicates a duration of a timer associated with an active duration for the first UE to receive sidelink retransmissions during the sidelink discontinuous reception procedure, means for receiving, from a second UE, a first sidelink communication including data based on receiving the control signaling indicating the configuration for performing the sidelink discontinuous reception procedure, means for transmitting, to the second UE, feedback requesting a retransmission of the data based on receiving the first sidelink communication, means for initiating the timer in response to transmitting the feedback based on receiving the first sidelink communication, and means for receiving, based on initiating the timer, a second sidelink communication including the retransmission of the data, the second sidelink communication received via resources associated with the sidelink resource reservation procedure.

A non-transitory computer-readable medium storing code for wireless communication at a first UE is described. The code may include instructions executable by a processor to receive control signaling indicating a configuration for performing a sidelink discontinuous reception procedure that is associated with a sidelink resource reservation procedure, where the configuration indicates a duration of a timer associated with an active duration for the first UE to receive sidelink retransmissions during the sidelink discontinuous reception procedure, receive, from a second UE, a first sidelink communication including data based on receiving the control signaling indicating the configuration for performing the sidelink discontinuous reception procedure, transmit, to the second UE, feedback requesting a retransmission of the data based on receiving the first sidelink communication, initiate the timer in response to transmitting the feedback based on receiving the first sidelink communication, and receive, based on initiating the timer, a second sidelink communication including the retransmission of the data, the second sidelink communication received via resources associated with the sidelink resource reservation procedure.

Some examples of the method, apparatuses, and non-transitory computer-readable medium described herein may further include operations, features, means, or instructions for initiating, in response to transmitting the feedback, a second timer associated with an inactive duration for the first UE to receive sidelink transmissions during the sidelink discontinuous reception procedure, where initiating the timer associated with the active duration for the first UE may be based on initiating the second timer.

In some examples of the method, apparatuses, and non-transitory computer-readable medium described herein, an expiration of the second timer triggers the initiating the timer associated with the active duration for the first UE.

Some examples of the method, apparatuses, and non-transitory computer-readable medium described herein may further include operations, features, means, or instructions for identifying, from a first time associated with an expiration of the second timer and a second time indicated by the configuration for performing the sidelink discontinuous reception procedure corresponding to a period of time prior to the resources for receiving the second sidelink communication, a time for initiating the timer associated with the active duration for the first UE to receive sidelink retransmissions, where initiating the timer may be based on the identifying.

In some examples of the method, apparatuses, and non-transitory computer-readable medium described herein, initiating the timer in response to transmitting the feedback may include operations, features, means, or instructions for initiating the timer at a time indicated by the configuration for performing the sidelink discontinuous reception procedure and based on the sidelink resource reservation procedure.

In some examples of the method, apparatuses, and non-transitory computer-readable medium described herein, the time indicated by the configuration corresponds to a period of time prior to the resources for receiving the second sidelink communication.

In some examples of the method, apparatuses, and non-transitory computer-readable medium described herein, the first sidelink communication includes control information indicating the resources associated with the sidelink resource reservation procedure for receiving the second sidelink communication.

In some examples of the method, apparatuses, and non-transitory computer-readable medium described herein, transmitting the feedback may include operations, features, means, or instructions for transmitting a hybrid automatic repeat request (HARQ) requesting the retransmission of the data based on failing to decode the data in the first sidelink communication.

A method for wireless communication at a first UE is described. The method may include receiving control signaling indicating a configuration for performing a sidelink discontinuous reception procedure that is associated with receiving identifiers that identify UEs in sidelink communications, where the configuration indicates a duration of a timer associated with an active duration for the first UE to receive sidelink retransmissions, receiving, from a second UE based on receiving the control signaling indicating the configuration for performing the sidelink discontinuous reception procedure, a first sidelink communication including control information including at least a portion of an identifier of the first UE and data including the identifier of the first UE, transmitting, to the second UE, feedback requesting a retransmission of the data based on receiving the first sidelink communication and the data including the identifier of the first UE, initiating the timer based on receiving the first sidelink communication, and receiving, based on initiating the timer, a second sidelink communication including the retransmission of the data.

An apparatus for wireless communication at a first UE is described. The apparatus may include a processor, memory coupled with the processor, and instructions stored in the memory. The instructions may be executable by the processor to cause the apparatus to receive control signaling indicating a configuration for performing a sidelink discontinuous reception procedure that is associated with receiving identifiers that identify UEs in sidelink communications, where the configuration indicates a duration of a timer associated with an active duration for the first UE to receive sidelink retransmissions, receive, from a second UE based on receiving the control signaling indicating the configuration for performing the sidelink discontinuous reception procedure, a first sidelink communication including control information including at least a portion of an identifier of the first UE and data including the identifier of the first UE, transmit, to the second UE, feedback requesting a retransmission of the data based on receiving the first sidelink communication and the data including the identifier of the first UE, initiate the timer based on receiving the first sidelink communication, and receive, based on initiating the timer, a second sidelink communication including the retransmission of the data.

Another apparatus for wireless communication at a first UE is described. The apparatus may include means for receiving control signaling indicating a configuration for performing a sidelink discontinuous reception procedure that is associated with receiving identifiers that identify UEs in sidelink communications, where the configuration indicates a duration of a timer associated with an active duration for the first UE to receive sidelink retransmissions, means for receiving, from a second UE based on receiving the control signaling indicating the configuration for performing the sidelink discontinuous reception procedure, a first sidelink communication including control information including at least a portion of an identifier of the first UE and data including the identifier of the first UE, means for transmitting, to the second UE, feedback requesting a retransmission of the data based on receiving the first sidelink communication and the data including the identifier of the first UE, means for initiating the timer based on receiving the first sidelink communication, and means for receiving, based on initiating the timer, a second sidelink communication including the retransmission of the data.

A non-transitory computer-readable medium storing code for wireless communication at a first UE is described. The code may include instructions executable by a processor to receive control signaling indicating a configuration for performing a sidelink discontinuous reception procedure that is associated with receiving identifiers that identify UEs in sidelink communications, where the configuration indicates a duration of a timer associated with an active duration for the first UE to receive sidelink retransmissions, receive, from a second UE based on receiving the control signaling indicating the configuration for performing the sidelink discontinuous reception procedure, a first sidelink communication including control information including at least a portion of an identifier of the first UE and data including the identifier of the first UE, transmit, to the second UE, feedback requesting a retransmission of the data based on receiving the first sidelink communication and the data including the identifier of the first UE, initiate the timer based on receiving the first sidelink communication, and receive, based on initiating the timer, a second sidelink communication including the retransmission of the data.

In some examples of the method, apparatuses, and non-transitory computer-readable medium described herein, initiating the timer may include operations, features, means, or instructions for initiating, based on identifying that the data includes the identifier of the first UE, the timer at a time indicated by the configuration for performing the sidelink discontinuous reception procedure.

In some examples of the method, apparatuses, and non-transitory computer-readable medium described herein, the time indicated by the configuration corresponds to a first period of time after receiving the first sidelink communication, a second period of time after transmitting the feedback, or a combination thereof.

Some examples of the method, apparatuses, and non-transitory computer-readable medium described herein may further include operations, features, means, or instructions for receiving, from the second UE based on receiving the control signaling indicating the configuration for performing the sidelink discontinuous reception procedure, a third sidelink communication including second control information including at least a portion of a second identifier of a third UE and second data including the second identifier of the third UE, initiating the timer in response to detecting the second control information in the third sidelink communication, identifying, based on initiating the timer and receiving the third sidelink communication, that the second identifier of the third UE may be different from the identifier of the first UE, and resetting the timer based on identifying that the second identifier of the third UE may be different from the identifier of the first UE.

In some examples of the method, apparatuses, and non-transitory computer-readable medium described herein, initiating the timer may include operations, features, means, or instructions for initiating the timer in response to detecting the control information in the first sidelink communication, where transmitting the feedback may be based on initiating the timer.

Some examples of the method, apparatuses, and non-transitory computer-readable medium described herein may further include operations, features, means, or instructions for receiving, from the second UE based on receiving the control signaling indicating the configuration for performing the sidelink discontinuous reception procedure, a third sidelink communication including second control information including at least a portion of a second identifier of a third UE and refraining from decoding second data included in the third sidelink communication based on the portion of the second identifier of the third UE being different from the portion of the identifier of the first UE.

In some examples of the method, apparatuses, and non-transitory computer-readable medium described herein, the identifiers that identify UEs may be media access control (MAC) addresses identifying UEs in sidelink communications.

A method for wireless communication at a first UE is described. The method may include receiving control signaling indicating a configuration for performing a sidelink discontinuous reception procedure that is associated with blind retransmissions for sidelink communications, where the configuration indicates a duration of a timer associated with an active duration for the first UE to receive the blind retransmissions during the sidelink discontinuous reception procedure, receiving, from a second UE, a first sidelink communication including data based on receiving the configuration for performing the sidelink discontinuous reception procedure, initiating the timer based on receiving the first sidelink communication, and receiving, based on initiating the timer, a second sidelink communication including a blind retransmission of the data.

An apparatus for wireless communication at a first UE is described. The apparatus may include a processor, memory coupled with the processor, and instructions stored in the memory. The instructions may be executable by the processor to cause the apparatus to receive control signaling indicating a configuration for performing a sidelink discontinuous reception procedure that is associated with blind retransmissions for sidelink communications, where the configuration indicates a duration of a timer associated with an active duration for the first UE to receive the blind retransmissions during the sidelink discontinuous reception procedure, receive, from a second UE, a first sidelink communication including data based on receiving the configuration for performing the sidelink discontinuous reception procedure, initiate the timer based on receiving the first sidelink communication, and receive, based on initiating the timer, a second sidelink communication including a blind retransmission of the data.

Another apparatus for wireless communication at a first UE is described. The apparatus may include means for receiving control signaling indicating a configuration for performing a sidelink discontinuous reception procedure that is associated with blind retransmissions for sidelink communications, where the configuration indicates a duration of a timer associated with an active duration for the first UE to receive the blind retransmissions during the sidelink discontinuous reception procedure, means for receiving, from a second UE, a first sidelink communication including data based on receiving the configuration for performing the sidelink discontinuous reception procedure, means for initiating the timer based on receiving the first sidelink communication, and means for receiving, based on initiating the timer, a second sidelink communication including a blind retransmission of the data.

A non-transitory computer-readable medium storing code for wireless communication at a first UE is described. The code may include instructions executable by a processor to receive control signaling indicating a configuration for performing a sidelink discontinuous reception procedure that is associated with blind retransmissions for sidelink communications, where the configuration indicates a duration of a timer associated with an active duration for the first UE to receive the blind retransmissions during the sidelink discontinuous reception procedure, receive, from a second UE, a first sidelink communication including data based on receiving the configuration for performing the sidelink discontinuous reception procedure, initiate the timer based on receiving the first sidelink communication, and receive, based on initiating the timer, a second sidelink communication including a blind retransmission of the data.

Some examples of the method, apparatuses, and non-transitory computer-readable medium described herein may further include operations, features, means, or instructions for restarting the timer in response to receiving the second sidelink communication including the blind retransmission of the data.

Some examples of the method, apparatuses, and non-transitory computer-readable medium described herein may further include operations, features, means, or instructions for determining, based on control information included in the first sidelink communication, that the data in the first sidelink communication may be associated with a new transmission, where initiating the timer may be based on the data in the first sidelink communication being associated with the new transmission and refraining from restarting the timer after receiving the second sidelink communication based on the second sidelink communication including the blind retransmission of the data.

DETAILED DESCRIPTION

Figure 1:
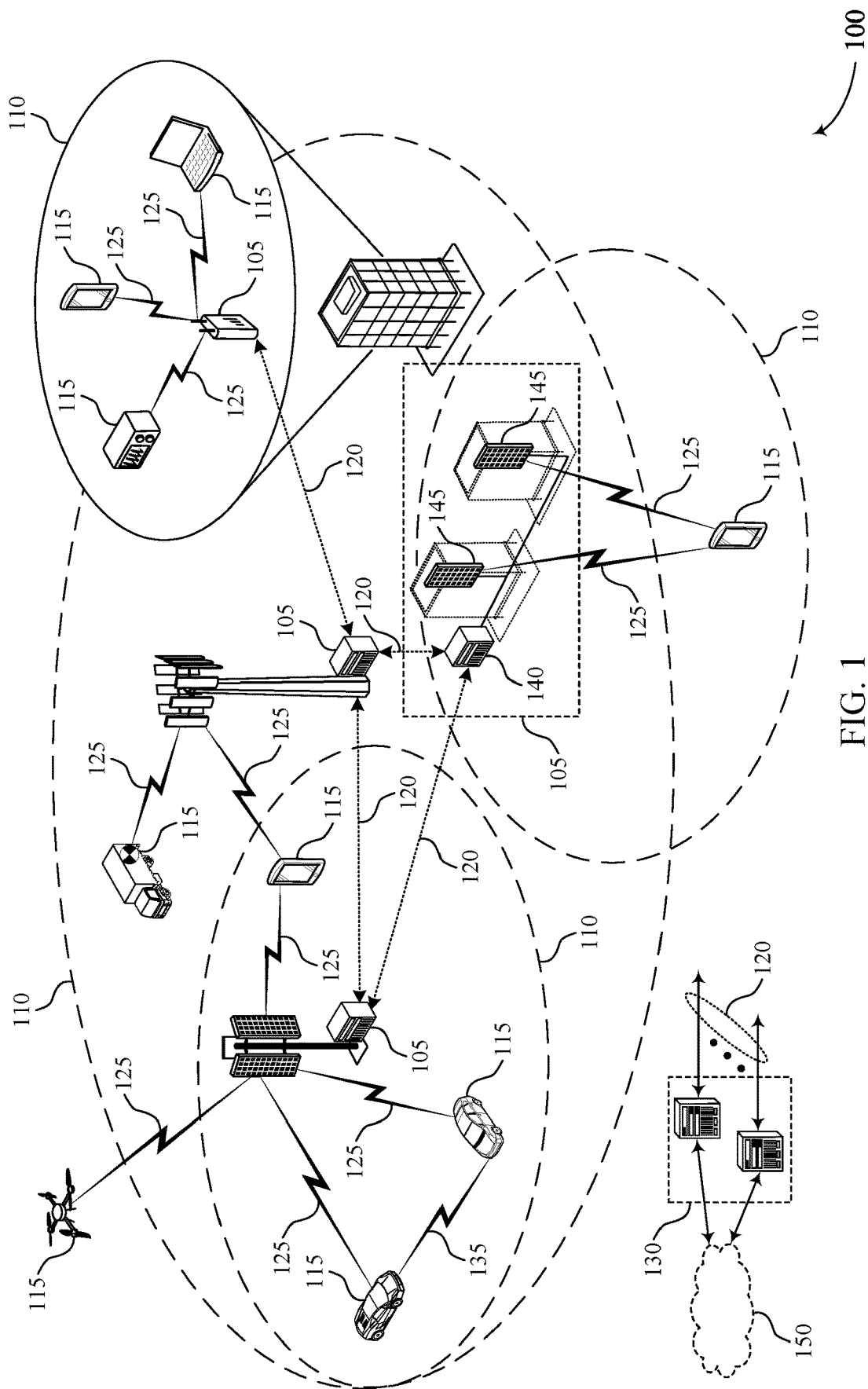
FIG. 1 illustrates an example of a wireless communications system that supports discontinuous reception operation for sidelink communications in accordance with aspects of the present disclosure.

Some wireless communications systems may support sidelink discontinuous reception procedures, where a user equipment (UE) transitions between active durations (e.g., where the UE is monitoring for sidelink communications) and inactive durations (e.g., where the UE refrains from monitoring for sidelink communications). Relying on discontinuous reception for sidelink communications (e.g., when compared to a procedure for sidelink communications where the UE is continuously active) may result in decreased power consumption at the UE. In some cases, the active durations for the UE (e.g., during the discontinuous reception procedure for sidelink communications) may be defined by a timer. That is, the UE may enter into an active duration in response to initiating the timer and may transition into the inactive duration based on an expiration of the timer. Generally, the described techniques provided for sidelink discontinuous reception procedure configurations that indicate a duration of a timer (e.g., associated with an active duration for the UE) such that the UE is in an active duration to receive retransmissions of data from another UE as part of the sidelink discontinuous reception procedure.

In an example of a sidelink discontinuous reception procedure associated with a sidelink resource reservation procedure, the UE may initiate the timer in response to transmitting feedback requesting a retransmission of data received from another UE and receive the retransmission based on initiating the timer. In some cases, the UE may initiate the timer in response to an expiration of a different timer (e.g., associated with an inactive duration) that is initiated based on transmitting the feedback requesting the retransmission. In some other cases, the UE may initiate the timer at a time indicated by the configuration (e.g., associated with the sidelink discontinuous reception procedure).

In an example of a sidelink discontinuous reception procedure associated with receiving identifiers that identify UEs in sidelink communications, the UE may initiate the timer based on receiving a first sidelink communication (e.g., that includes an identifier associated with the UE) and may subsequently receive a retransmission of data (e.g., originally included in the first sidelink communication) based on initiating the timer. In a first case, the UE may initiate the timer at a time indicated by the configuration and based on the first sidelink communication including an identifier associated with the UE. In another case, the UE may initiate the timer based on receiving the first sidelink communication (e.g., prior to determining whether the first sidelink communication includes the identifier associated with the UE). Here, the UE may optionally reset the timer in cases that the first sidelink communication does not include the identifier associated with the UE (e.g., and may not receive a retransmission).

In an example of a sidelink discontinuous reception procedure associated with blind retransmissions, the UE may initiate the timer in response to receiving a first sidelink transmission. In one case, the UE may initiate the timer in cases that sidelink transmissions include new data (e.g., instead of retransmitted data). In another case, the UE may additionally initiate the timer in cases that the sidelink transmissions include data retransmissions.

Aspects of the disclosure are initially described in the context of wireless communications systems. Aspects of the disclosure are then described in the context of timing diagrams and process flows. Aspects of the disclosure are further illustrated by and described with reference to apparatus diagrams, system diagrams, and flowcharts that relate to discontinuous reception operation for sidelink communications.

FIG. 1 illustrates an example of a wireless communications system 100 that supports discontinuous reception operation for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the media access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support sidelink discontinuous reception procedures, where a UE 115 transitions between active durations (e.g., where the UE 115 is monitoring for sidelink communications) and inactive durations (e.g., where the UE 115 refrains from monitoring for sidelink communications). In some cases, the active durations for the UE 115 (e.g., during the discontinuous reception procedure for sidelink communications) may be defined by a timer. That is, the UE 115 may enter into an active duration in response to initiating the timer and may transition into the inactive duration based on an expiration of the timer.

When performing a discontinuous reception procedure for sidelink communications, the UE 115 may receive control signaling indicating the configuration for the discontinuous reception procedure (e.g., indicating a duration of the timer associated with the active duration of the UE 115). Then, the UE 115 may receive sidelink communications from another UE (e.g., including data, including control information such as sidelink control information (SCI)) according to the configuration. The UE 115 may attempt to decode the data within the sidelink communication and in cases that the UE 115 is unable to decode the data, the UE 115 may receive a retransmission of the data (e.g., in a subsequent sidelink communication). For some types of discontinuous reception procedures, the UE 115 may transmit a feedback message requesting the retransmission of the data and may receive the retransmission in response to the feedback message. Generally, the described techniques provide for sidelink discontinuous reception procedure configurations that indicate a duration of a timer (e.g., associated with an active duration for the UE 115) such that the UE 115 is in an active duration to receive retransmissions of data from another UE 115 as part of the sidelink discontinuous reception procedure.

In some cases, the UE 115 may be configured to perform a sidelink discontinuous reception procedure associated with a sidelink resource reservation procedure (e.g., sidelink mode 2). Here, the UE 115 may receive control signaling (e.g., SCI) indicating a configuration for the sidelink discontinuous reception procedure associated with the sidelink resource reservation procedure. When receiving sidelink communications during the sidelink discontinuous reception procedure associated with the sidelink resource reservation procedure, the SCI includes reservation information (e.g., reserving resources for feedback messages, reserving resources for data retransmissions). In some instances, the reservation information may be in units of sub-channels in the frequency domain and may be associated with a single slot in the time domain. Additionally or alternatively, the reservations may be for a window associated with a quantity of logical slots (e.g., a window of 32 logical slots). In some examples, the resource reservations may be periodic or aperiodic. In an example of periodic resource reservations, the period may be configured within the control signaling (e.g., a period between 0 ms and 1000 ms). Additionally, periodic resource reservation may be disabled (e.g., by additional configuration information).

When performing the sidelink discontinuous reception procedure associated with the sidelink resource reservation procedures, the UE 115 may initiate the timer in response to transmitting feedback requesting a retransmission of data received from another UE 115. Additionally, the UE 115 may receive the retransmission based on initiating the timer. In some cases, the UE 115 may initiate the timer in response to an expiration of a different timer (e.g., associated with an inactive duration) that is initiated based on transmitting the feedback requesting the retransmission. In some other cases, the UE 115 may initiate the timer at a time indicated by the configuration (e.g., associated with the sidelink discontinuous reception procedure).

In some cases, the UE 115 may be configured to perform a sidelink discontinuous reception procedure associated with receiving identifiers that identify UEs 115 in sidelink communications. Here, the UE 115 may receive control signaling (e.g., SCI-2) indicating a configuration for the sidelink discontinuous reception procedure associated with receiving identifiers that identify UEs 115 in sidelink communications. When receiving sidelink communications associated with the sidelink discontinuous reception procedure associated with receiving identifiers that identify UEs 115 in sidelink communications, the SCI (e.g., included in a sidelink communication) may include a feedback process identifier (e.g., a HARQ process identifier), a network device identifier, a source identifier (e.g., an identifier for the transmitting UE 115), a destination identifier (e.g., an identifier for the receiving UE 115), and, optionally, a channel state information report trigger (e.g., for unicast sidelink communications). Additionally, the SCI may include shortened identifiers (e.g., the source identifier, the destination identifier) and the data within the sidelink communication (e.g., received via the physical sidelink shared channel (PSSCH) may include the full identifiers. Thus, when the UE 115 receives a sidelink communication including the SCI and data, the UE 115 may compare the destination identifiers (e.g., the shortened destination identifier within the SCI and the full destination identifier within the data) to determine whether the sidelink communication is intended for the UE 115.

When performing the sidelink discontinuous reception procedure associated with receiving identifiers that identify UEs 115 in sidelink communications, the UE 115 may initiate the timer (e.g., associated with the active duration) based on receiving a first sidelink communication (e.g., that includes an identifier associated with the UE) and may subsequently receive data transmission based on initiating the timer. In a first case, the UE 115 may initiate the timer at a time indicated by the configuration and based on the first sidelink communication including an identifier associated with the UE 115. In another case, the UE 115 may initiate the timer based on receiving the first sidelink communication (e.g., prior to determining whether the first sidelink communication includes the identifier associated with the UE 115). Here, the UE 115 may optionally reset the timer to be zero in cases that the first sidelink communication does not include the identifier associated with the UE 115 (e.g., and may not receive subsequent data transmissions unless other timers put UE in active state).

In some cases, the UE 115 may be configured to perform a sidelink discontinuous reception procedure associated with blind retransmissions. Here, a first UE 115 may transmit retransmissions of sidelink data to other UEs 115 without receiving feedback (e.g., HARQ acknowledgement or negative acknowledgement feedback). In some cases, blind retransmissions may be associated with decreased latency for data retransmissions (e.g., when compared to retransmissions sent in response to feedback). When performing the sidelink discontinuous reception procedure associated with blind retransmissions, the UE 115 may initiate the timer in response to receiving a first sidelink transmission. In one case, the UE 115 may initiate the timer in cases that sidelink transmissions include new data (e.g., instead of retransmitted data). In another case, the UE 115 may additionally initiate the timer in cases that the sidelink transmissions include data retransmissions.

Figure 2:
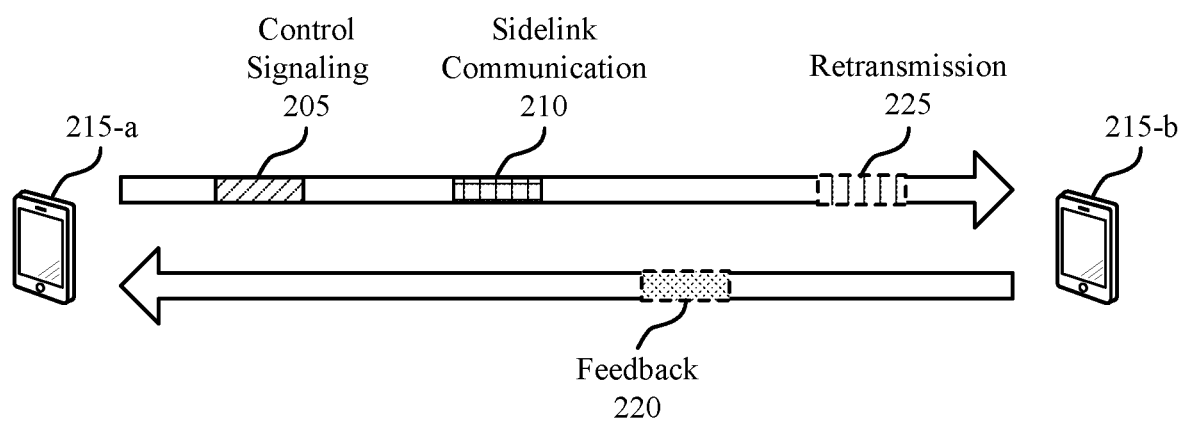
FIG. 2 illustrates an example of a wireless communications system that supports discontinuous reception operation for sidelink communications in accordance with aspects of the present disclosure.

FIG. 2 illustrates an example of a wireless communications system 200 that supports discontinuous reception operation for sidelink communications in accordance with aspects of the present disclosure. In some examples, wireless communications system 200 may implement aspects of wireless communication systems 100. For example, wireless communications system 200 may include UEs 215, which may be examples of the UEs 115 as described with reference to FIG. 1.

Wireless communications system 200 may include UE 215-*a* and UE 215-*b*, which may be communicating via sidelinks according to a discontinuous reception procedure. For example, the UE 215-*b* may transition between active durations (e.g., where the UE 215-*b* is in an active state and monitoring resources associated with the sidelink for communications from the UE 215-*a*) and inactive durations (e.g., where the UE 215-*b* is in an inactive state and refraining from monitoring resources associated with the sidelink for communications from the UE 215-*a*). In some instances, performing a discontinuous reception procedure for sidelink communications may consume less power when compared to a continuous reception procedure for sidelink communications (e.g., where the UE 215-*b* remains in an active state rather than transitioning to an inactive state).

The UE 215-*b* may transition between active an inactive states based on initiating timers (and the corresponding expiration of the timers). For example, the UE 215-*b* may transition to an active state upon initiating a first timer (e.g., a drx-Inactivity Timer Duration) and may transition to an inactive state upon the expiration of the first timer. Additionally, the UE 215-*b* may transition to an inactive state upon initiating another timer (e.g., a drx-HARQ-RTT-Timer) and may transition to an active state upon the expiration of the timer. In some cases, the timers may be configured (e.g., durations of the timers may be configured) via control signaling 205 received by the UE 215-*b*.

The UE 215-*a* may transmit control signaling 205 to the UE 215-*b* indicating a configuration for the discontinuous reception procedure for the sidelink communications (e.g., between the UEs 215). In some cases, the configuration may indicate a type of discontinuous reception procedure (e.g., a sidelink discontinuous reception procedure associated with a sidelink resource reservation procedure, a sidelink discontinuous reception procedure associated with receiving identifiers that identify UEs in sidelink communications, a sidelink discontinuous reception procedure associated with blind retransmissions). Additionally, the configuration may indicate a duration of one or more timers associated with the discontinuous reception procedure. For example, the configuration may include a duration for a timer associated with an active duration of the UE 215-b. In another example, the configuration may include a duration for a timer associated with an inactive duration of the UE 215-b. Additionally, the configuration may indicate when the UE 215-b is to initiate the timer (e.g., start the timer) or reset the timer (e.g., stop the timer).

Based on transmitting the control signaling 205, the UE 215-a may transmit a sidelink communication 210 to the UE 215-b. The sidelink transmission may include control information (e.g., SCI) and data (e.g., data transmitted via a PSSCH). The UE 215-b may receive and decode the SCI, the data, or both. In cases that the UE 215-b is unable to successfully decode the data included within the sidelink communication 210, the UE 215-b may optionally transmit feedback 220 requesting a retransmission of the data to the UE 215-b.

In some other cases, the UE 215-b may not transmit the feedback 220. For example, the UE 215-b may be executing a discontinuous reception procedure associated with blind retransmissions. Here, even in cases that the UE 215-b fails to successfully decode the data within the sidelink communication 210, the UE 215-b may not transmit the feedback 220 to the UE 215-a. Additionally, the UE 215-b may not transmit the feedback 220 requesting retransmission in cases that the UE 215-b successfully decodes the data within the sidelink communication 210. Additionally, the UE 215-b may not transmit the feedback 220 requesting retransmission in cases that the UE 215-b determines that the data is not intended for the UE 215-b based on a destination identifier within the sidelink communication 210 being different from the identifier of the UE 215-b.

In some cases, the UE 215-a may transmit the retransmission 225 to the UE 215-b (e.g., within another sidelink communication). For example, the UE 215-a may transmit the retransmission 225 in response to receiving the feedback 220 requesting the retransmission 225. In another example, the UE 215-a may transmit the retransmission 225 without receiving the feedback 220 (e.g., in cases that the UE 215-a is performing a discontinuous reception procedure associated with blind retransmissions). In either example, the UE 215-b may be in an active state to receive the retransmission 225 based on initiating a timer associated with an active duration prior to receiving the retransmission 225.

In an example of a sidelink discontinuous reception procedure associated with a sidelink resource reservation procedure, the UE 215-b may initiate the timer in response to transmitting feedback 220 requesting the retransmission 225. In some cases, the UE 215-b may initiate the timer in response to an expiration of a different timer (e.g., associated with an inactive duration) that the UE 215-b may initiate based on transmitting the feedback 220. In some other cases, the UE 215-b may initiate the timer at a time indicated by the configuration (e.g., signaled to the UE 215-b at 205).

In an example of a sidelink discontinuous reception procedure associated with receiving identifiers that identify UEs 215 in sidelink communications, the UE 215-b may initiate the timer based on receiving the sidelink communication 210 and may subsequently receive the retransmission 225 based on initiating the timer. Here, the retransmission 225 may alternatively include a subsequent data transmission (e.g., instead of a data retransmission 225). In a first case, the UE 215-b may initiate the timer at a time indicated by the configuration (e.g., signaled at 205) and based on the sidelink communication 210 including an identifier associated with the UE 215-b (e.g., a MAC-ID of the UE 215-b). In another case, the UE 215-b may initiate the timer based on receiving the sidelink communication 210 (e.g., prior to determining whether the sidelink communication 210 includes the identifier associated with the UE 215-b). Here, the UE 215-b may optionally reset the timer in cases that the sidelink communication 210 does not include the identifier associated with the UE 215-b (e.g., and may not receive a retransmission 225).

In an example of a sidelink discontinuous reception procedure associated with blind retransmissions, the UE 215-b may initiate the timer in response to receiving the sidelink communication 210. In one case, the UE 215-b may initiate the timer in cases that sidelink communication 210 include new data (e.g., instead of retransmitted data). In another case, the UE 215-b may additionally initiate the timer in cases that the sidelink communication 210 include data retransmissions.

Figure 3:
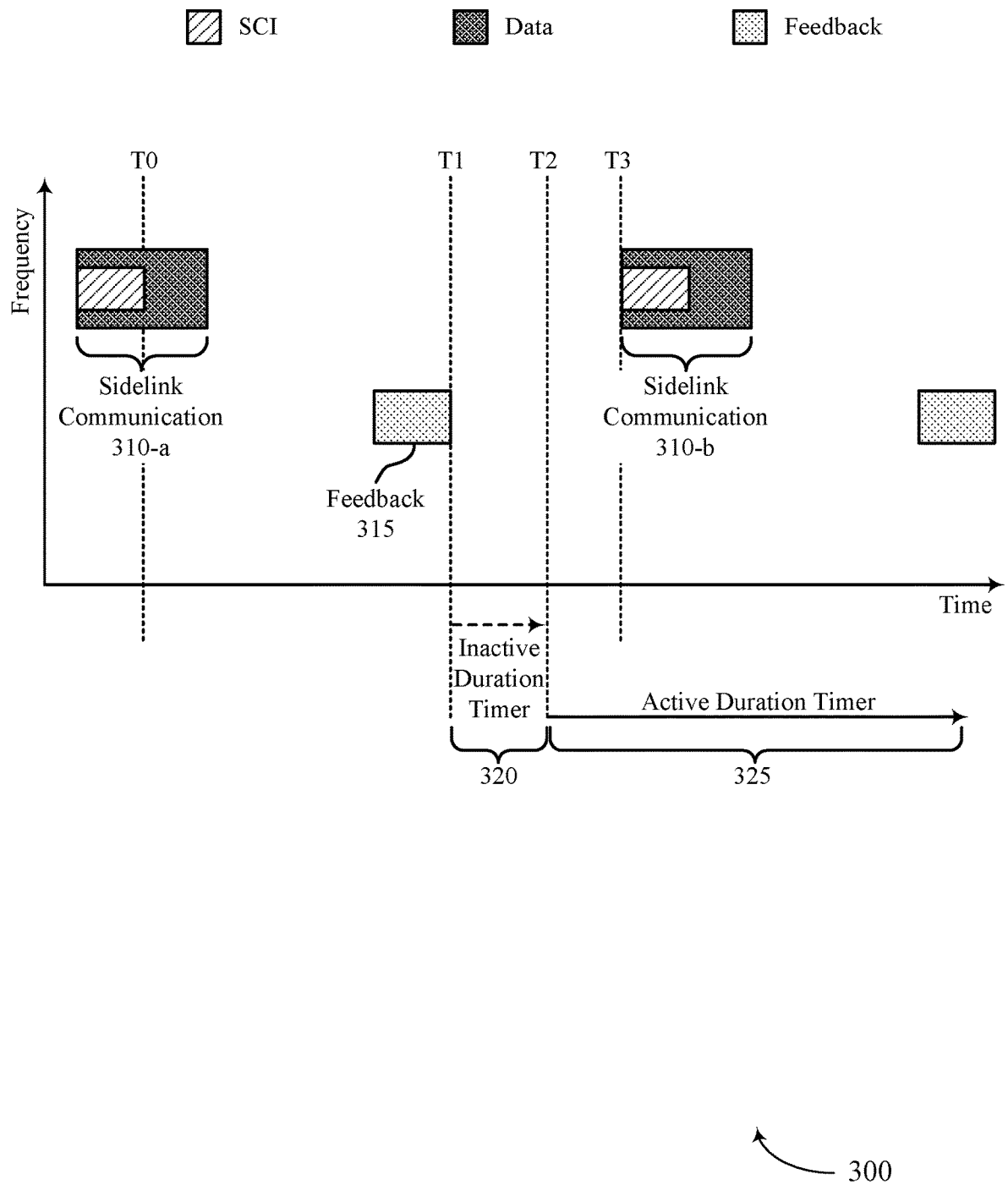
FIGS. 3 through 5 illustrate example timing diagrams that support discontinuous reception operation for sidelink communications in accordance with aspects of the present disclosure.

FIG. 3 illustrates an example of a timing diagram 300 that supports discontinuous reception operation for sidelink communications in accordance with aspects of the present disclosure. In some cases, the timing diagram 300 may implement aspects of wireless communications systems 100 and 200 as described herein. For example, sidelink communications 310 and feedback 315 may be examples of transmissions between UEs via sidelinks as described with reference to FIGS. 1 and 2. The timing diagram 300 may illustrate an example inactive duration timer 320 and an active duration timer 325.

The timing diagram 300 may be an example timing diagram 300 corresponding to a sidelink discontinuous reception procedure associated with a sidelink resource reservation procedure. Here, the sidelink communications 310 may be transmitted (e.g., via sidelinks) from the first UE (e.g., to a second UE) while the feedback 315 may be transmitted from the second UE (e.g., to the first UE). Additionally, the sidelink communications 310 may include both control information (e.g., SCI) and data (e.g., transmitted via a PSSCH). In some cases, the SCI may include resource reservation information (e.g., reserving resources for the feedback 315, for other sidelink communications 310 such as retransmissions).

In the example of the timing diagram 300, the second UE may receive the SCI (e.g., within the sidelink communication 310-a) at time T0. In some cases, the second UE may initiate a timer associated with an active duration at time T0 (e.g., a drx-InactivityTimerDuration) in response to detecting the SCI within the sidelink communication 310-a). In the example of timing diagram 300, however, the second UE may instead initiate the active duration timer 325 based on transmitting the feedback 315. For example, the second UE may transmit the feedback 315 requesting a retransmission (e.g., of the data within the sidelink communication 310-a) and may initiate the active duration timer 325 based on transmitting the feedback 315.

In one example, the second UE may initiate the active duration timer 325 (e.g., a drx-Retransmission Timer) based on an expiration of the inactive duration timer 320 (e.g., a drx-HARQ-RTT-Timer). That is, after transmitting the feedback 315, the second UE may initiate the inactive duration timer 320 at time T1. The inactive duration timer 320 may span a duration from time T1 to time T2. For example, the second UE may count down the duration from time T1 to time T2 using the inactive duration timer 320. In another example, the second UE may start the inactive duration timer 320 at 0 and count up (e.g., to a value configured by control signaling indicating a configuration for the discontinuous reception procedure) until time T2. At time T2, the second UE may start the active duration timer 325 in response to an expiration of the inactive duration timer 320.

Thus, at time T2, the second UE may transition from an inactive state to an active state (e.g., and may begin monitoring resources to receive the retransmission via the sidelink communication 310-*b*) based on initiating the active duration timer 325.

In another example, the second UE may initiate the active duration timer 325 at time T2 based on a configuration (e.g., for the discontinuous reception procedure) indicating the time T2. That is, the second UE may not initiate the inactive duration timer 320 at time T1 and may instead initiate the active duration timer at T2 according to the time T2 indicated by the configuration. In one case, the configuration may indicate the time T2 by indicating a quantity of slots prior to the sidelink communication 310-*b*. Here, the quantity of slots associated with initiating the active duration timer 325 may be preconfigured (e.g., by the control signaling indicating the configuration for the discontinuous reception procedure) or signaled semi-statically (e.g., within SCI of a sidelink communication 310). Thus, at time T2 the second UE may transition to an active state based on initiating the active duration timer 325 (e.g., at time T2 as indicated by the configuration).

In another example, the second UE may initiate the active duration timer 325 based on either an expiration of the inactive duration timer 320 or the configured time for initiating the active duration timer 325. That is, the second UE may identify, from a first time associated with an expiration of the inactive duration timer 320 and a second time associated with the configured time for initiating the active duration timer 325, the time that occurs later. Here, the second UE may initiate the active duration timer 325 according to which time (e.g., from the first and second time) occurs later. In some instances, initiating the active duration timer 325 at the later time may increase a power savings of the second UE when compared to initiating the active duration timer 325 earlier (e.g., and spending more time in an active state).

At time T3 (e.g., after initiating the active duration timer 325), the second UE may receive a second sidelink communication 310-*b*, which may include the retransmission of the data transmitted by the first UE in response to receiving the feedback 315 requesting a retransmission.

Figure 4:
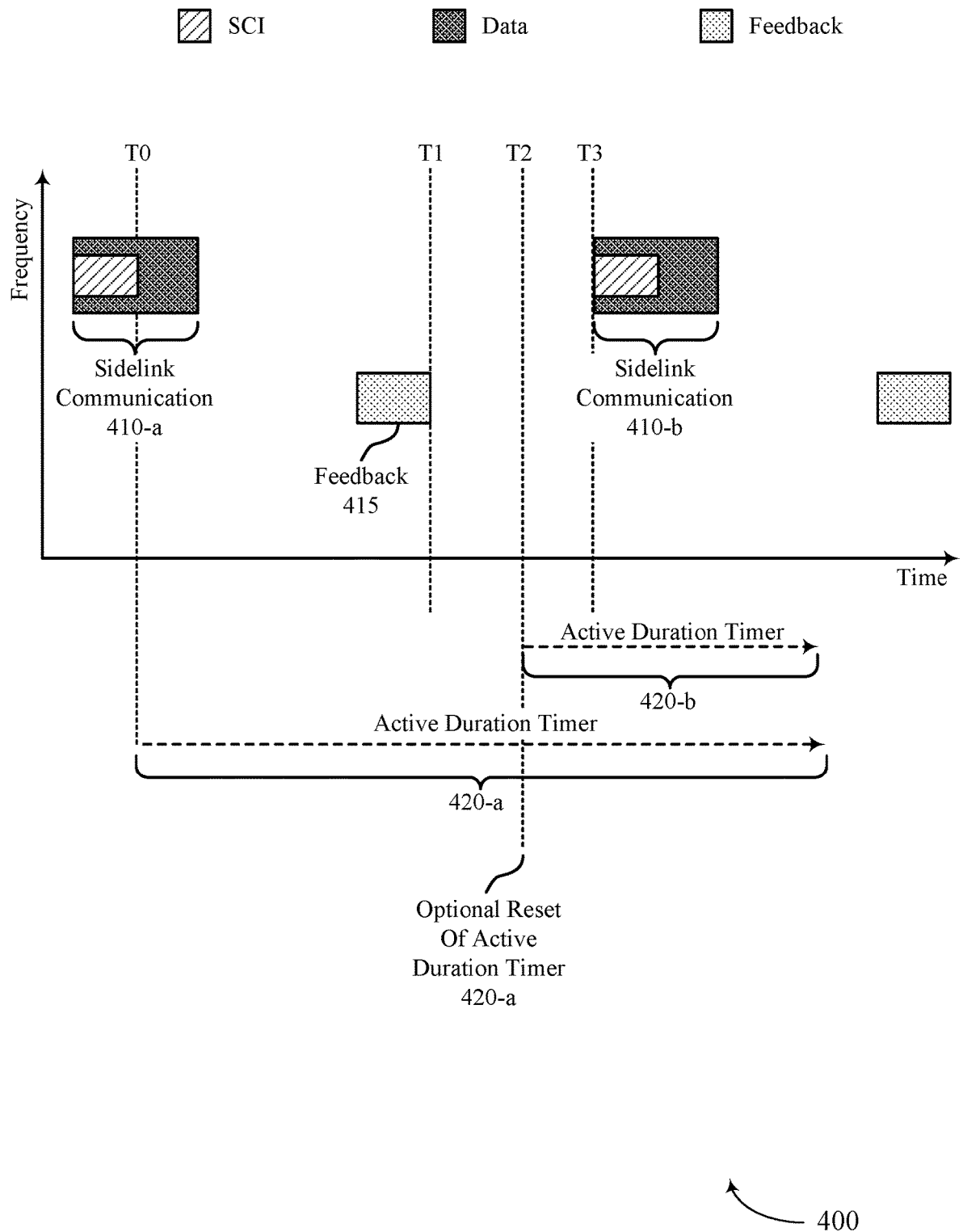

FIG. 4 illustrates an example of a timing diagram 400 that supports discontinuous reception operation for sidelink communications in accordance with aspects of the present disclosure. In some cases, the timing diagram 300 may implement aspects of wireless communications systems 100 and 200 as described herein. For example, sidelink communications 410 and feedback 415 may be examples of transmissions between UEs via sidelinks as described with reference to FIGS. 1 and 2. The timing diagram 400 may illustrate example active duration timers 420.

The timing diagram 400 may be an example timing diagram 400 corresponding to a sidelink discontinuous reception procedure associated with receiving identifiers that identify UEs in sidelink communications. Here, the sidelink communications 410 may be transmitted (e.g., via sidelinks) from the first UE to a second UE while the feedback 415 may be transmitted from the second UE to the first UE. Additionally, the sidelink communications 410 may include both control information (e.g., SCI) and data (e.g., transmitted via a PSSCH).

In the example of the timing diagram 400, the second UE may receive the SCI (e.g., within the sidelink communication 410-*a*) at time T0. In some cases, the SCI may include an abbreviated identifier of a destination UE (e.g., the second UE). For example, the SCI within the sidelink communication 410-*a* may include an abbreviated version of the MAC identifier associated with second UE. Additionally, the data of the sidelink communication 410-*a* may include the full identifier of the destination UE (e.g., the second UE). For example, the data within the sidelink communication 410-*a* may include a full version of the MAC identifier of the second UE.

The second UE may transmit feedback 415 to the first UE based on receiving the sidelink communication 410-*a*. For example, the feedback 415 may acknowledgement or negative acknowledgment messages (e.g., HARQ acknowledgement or negative acknowledgement feedback). In cases that the second UE is unable to decode the data within the sidelink communication 410-*a*, the second UE may transmit the feedback 415 requesting a retransmission (e.g., a HARQ NACK feedback). Here, the first UE may transmit the sidelink communication 410-*b* including the retransmission of data in response to the feedback 415. In order to receive the retransmission in the sidelink communication 410-*b*, the second UE may transition to an active state based on initiating the active duration timer 420.

In some cases, the second UE may initiate an active duration timer 420-*a* associated with an active duration at time T0 (e.g., a drx-InactivityTimerDuration) in response to detecting the SCI within the sidelink communication 410-*a*). In some cases, the second UE may initiate the active duration timer 420-*a* prior to decoding the SCI within the sidelink communication 410-*a* and prior to determining whether the abbreviated identifier within the SCI matches the identifier of the second UE. Here, the active duration timer 420 may extend from time T0 to after time T3 (e.g., when the first UE transmits the sidelink communication 410-*b* including a retransmission of data).

In some cases, the second UE may optionally reset the active duration timer 420-*a* at time T2 in cases that the second UE determines that the destination identifier within the sidelink communication 410-*a* is different from the identifier of the second UE (e.g., the sidelink communication 410-*a* is intended for a different UE from the second UE). That is, if the second UE determines that the sidelink communication 410-*a* is not intended for the second UE, the second UE may reset the active duration timer 420-*a* and transition from the active state to an inactive state.

In some other cases, the second UE may initiate the active duration timer 420-*b* at a time T2 in response to determining that the destination identifier within the data of the sidelink communication 410-*a* is the same as the identifier of the second UE (e.g., the sidelink communication 410-*a* is intended for the second UE). In some cases, the time T2 may be configured within the configuration for the discontinuous reception procedure. That is, the configuration may indicate time T2 (e.g., to the second UE) based on a quantity of slots after the UE detects the data within the sidelink communication 410-*a* or based on a quantity of slots after transmitting the feedback 415.

At time T3 (e.g., after initiating the active duration timer 420), the second UE may receive a second sidelink communication 410-*b*, which may include the retransmission of the data transmitted by the first UE in response to receiving the feedback 415 requesting a retransmission. In some other cases, the second sidelink communication 410-*b* may be a subsequent data transmission (e.g., including new data).

Figure 5:
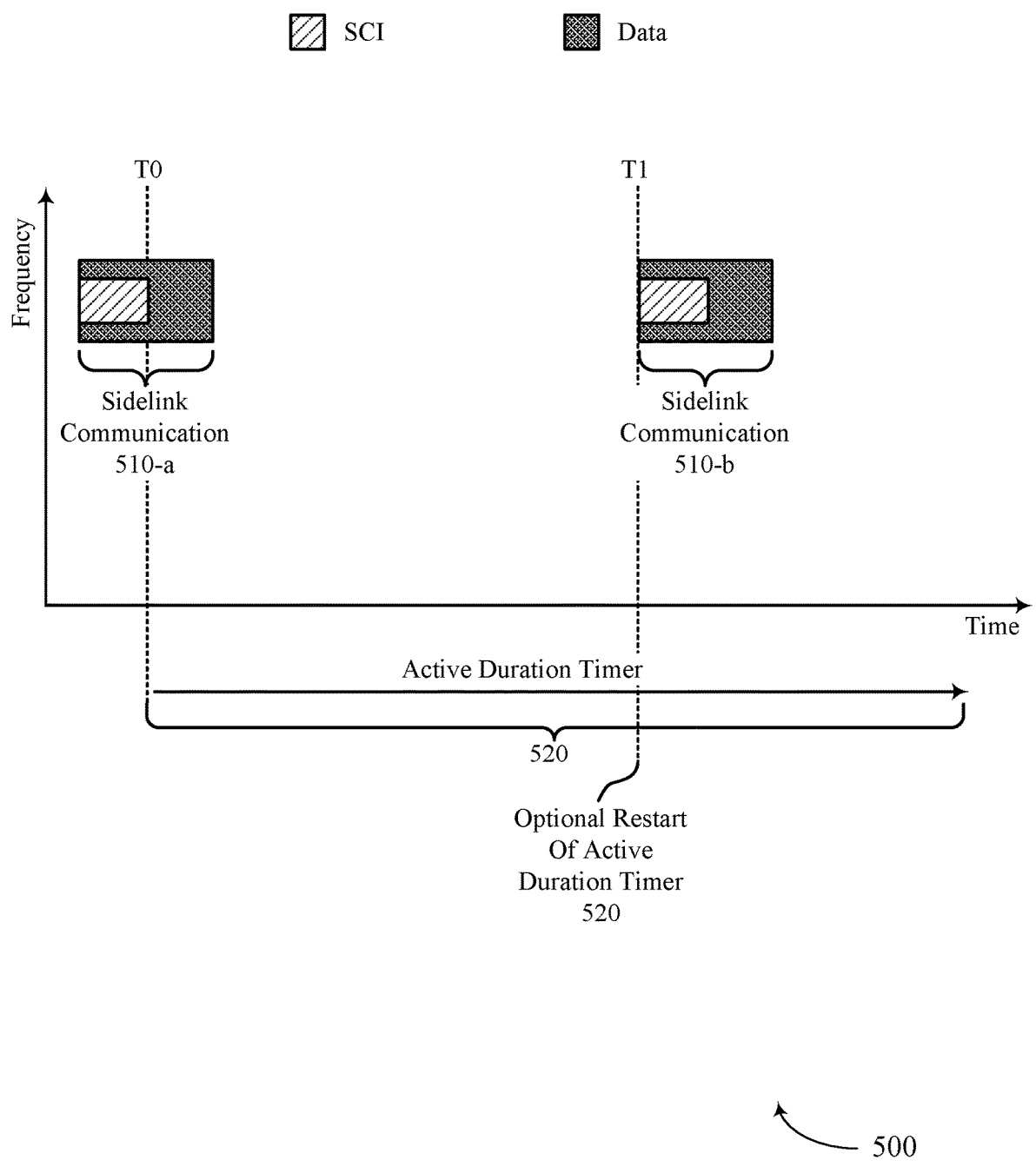

FIG. 5 illustrates an example of a timing diagram 500 that supports discontinuous reception operation for sidelink communications in accordance with aspects of the present disclosure. In some cases, the timing diagram 500 may implement aspects of wireless communications systems 100 and 200 as described herein. For example, sidelink communications 510 may be examples of transmissions between UEs via sidelinks as described with reference to FIGS. 1 and 2. The timing diagram 500 may illustrate example active duration timers 520.

The timing diagram 500 may be an example timing diagram 500 corresponding to a sidelink discontinuous reception procedure associated with blind retransmissions. Here, the sidelink communications 510 may be transmitted (e.g., via sidelinks) from the first UE to a second UE. Additionally, the sidelink communications 510 may include both control information (e.g., SCI) and data (e.g., transmitted via a PSSCH). In the example of the timing diagram 500, the first UE may transmit blind data retransmissions. For example, the sidelink communication 510-a may include new data while the sidelink communication 510-b may include retransmitted data.

In the example of the timing diagram 500, the second UE may receive the SCI within the sidelink communication 510-a at time T0. In response to detecting the SCI within the sidelink communication 510-a, the second UE may initiate the active duration timer 520. In some cases, the active duration timer 520 may extend a time period that enables the second UE to detect the subsequent sidelink communication 510-b that includes the blind data retransmission from the first UE.

In one example, the second UE may initiate the active duration timer 520 in cases that a sidelink communication 510-a includes new data (e.g., instead of retransmitted data). Here, the duration of the active duration timer 520 may be greater than a time period associated with a gap between sidelink communications 510 that may include new data or retransmitted data. Thus, the second UE may be in an active state to receive both data retransmissions and new data transmissions in subsequently sidelink communications 510. In another example, the second UE may restart the active duration timer 520 when the sidelink communication 510-b includes a retransmission of data.

Figure 6:
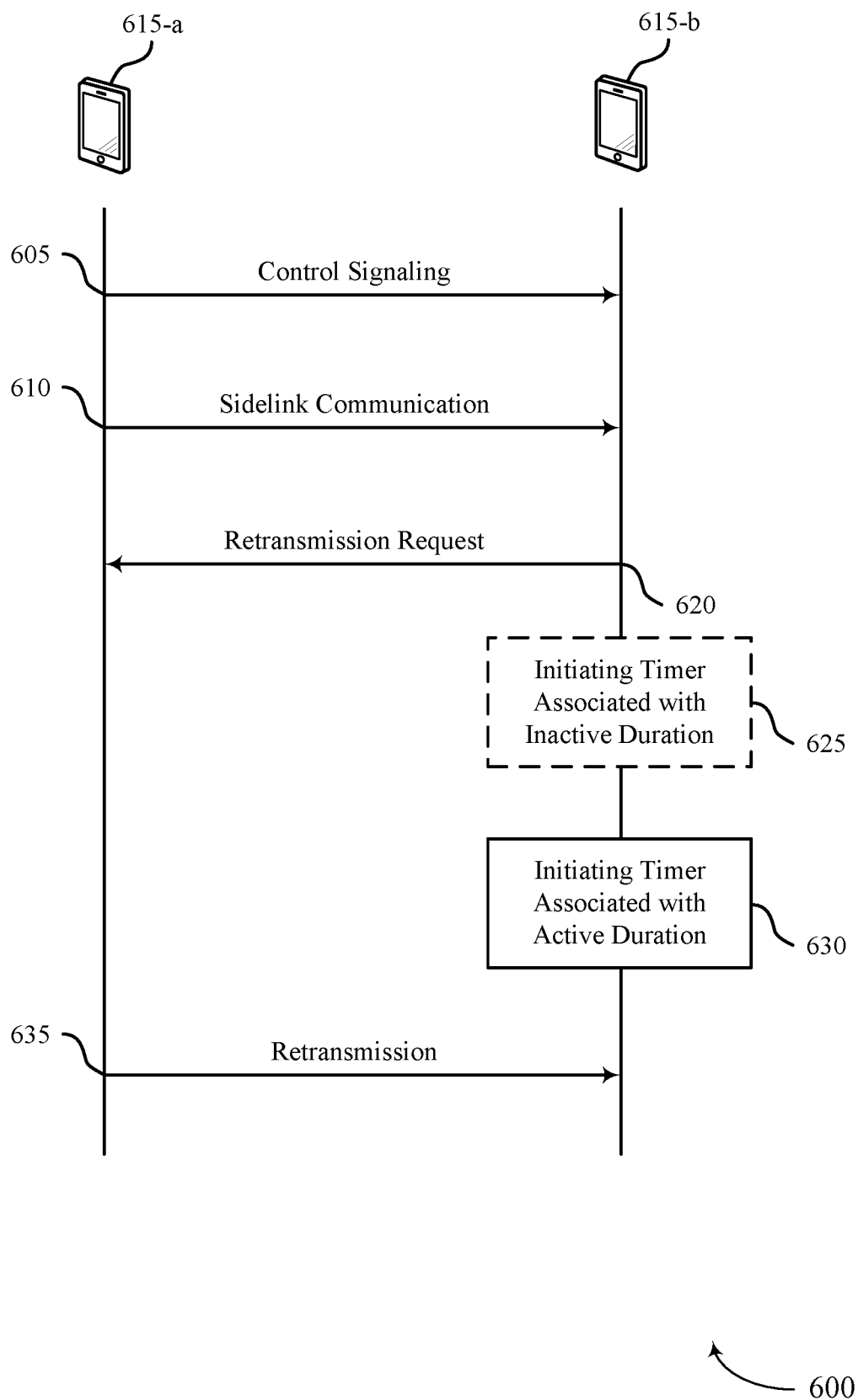
FIGS. 6 through 8 illustrate examples of process flows that support discontinuous reception operation for sidelink communications in accordance with aspects of the present disclosure.

FIG. 6 illustrates an example of a process flow 600 that supports discontinuous reception operation for sidelink communications in accordance with aspects of the present disclosure. In some examples, the process flow 600 may implement aspects of wireless communications systems and timing diagrams as described herein. For example, process flow 600 may include UEs 615, which may be examples of UEs as described herein. In the following description of the process flow 600, the operations between the UEs 615 may be transmitted in a different order than the order shown, or the operations performed by the UEs 615 may be performed in different orders or at different times. Certain operations may also be left out of the process flow 600, or other operations may be added to the process flow 600. The process flow 600 may illustrate an example of a sidelink discontinuous reception procedure associated with a sidelink resource reservation procedure.

At 605, the UE 615-a may transmit control signaling to the UE 615-b. The control signaling may indicate a configuration for performing a sidelink discontinuous reception procedure that is associated with a sidelink resource reservation procedure, where the configuration indicates a duration of a timer associated with an active duration for the UE 615-b to receive sidelink retransmissions during the sidelink discontinuous reception procedure.

At 610, the UE 615-a may transmit, to the UE 615-b, a first sidelink communication including data based on receiving the control signaling indicating the configuration for performing the sidelink discontinuous reception procedure. In some cases, the first sidelink communication may include control information indicating the resources associated with the sidelink resource reservation procedure for receiving the second sidelink communication.

At 620, the UE 615-b may transmit, to the UE 615-a, feedback requesting a retransmission of the data based on receiving the first sidelink communication. For example, the UE 615-b may transmit a HARQ requesting the retransmission of the data based on failing to decode the data in the first sidelink communication.

At 625, the UE 615-b may optionally initiate, in response to transmitting the feedback, a second timer associated with an inactive duration for the UE 615-b to receive sidelink transmissions during the sidelink discontinuous reception procedure.

At 630, the UE 615-b may initiate the timer in response to transmitting the feedback based on receiving the first sidelink communication. In some cases (e.g., in cases that the UE 615-b initiates the second timer at 625), the UE 615-b may initiate the timer based on initiating the second timer. For example, the expiration of the second timer may trigger the initiation of the timer at 630. In some other cases, the UE 615-b may identify, from a first time associated with an expiration of the second timer and a second time indicated by the configuration for performing the sidelink discontinuous reception procedure corresponding to a period of time prior to the resources for receiving the second sidelink communication, a time for initiating the timer associated with the active duration for the UE 615-b to receive sidelink retransmissions. Here, the UE 615-b may initiate the timer based on the identifying. In some other cases, the UE 615-b may initiate the timer at a time indicated by the configuration for performing the sidelink discontinuous reception procedure and based on the sidelink resource reservation procedure. Here, the time indicated by the configuration corresponds to a period of time prior to the resources for receiving a second sidelink communication (e.g., at 635).

At 635, the UE 615-b may receive, based on initiating the timer, a second sidelink communication including the retransmission of the data, the second sidelink communication received via resources associated with the sidelink resource reservation procedure.

Figure 7:
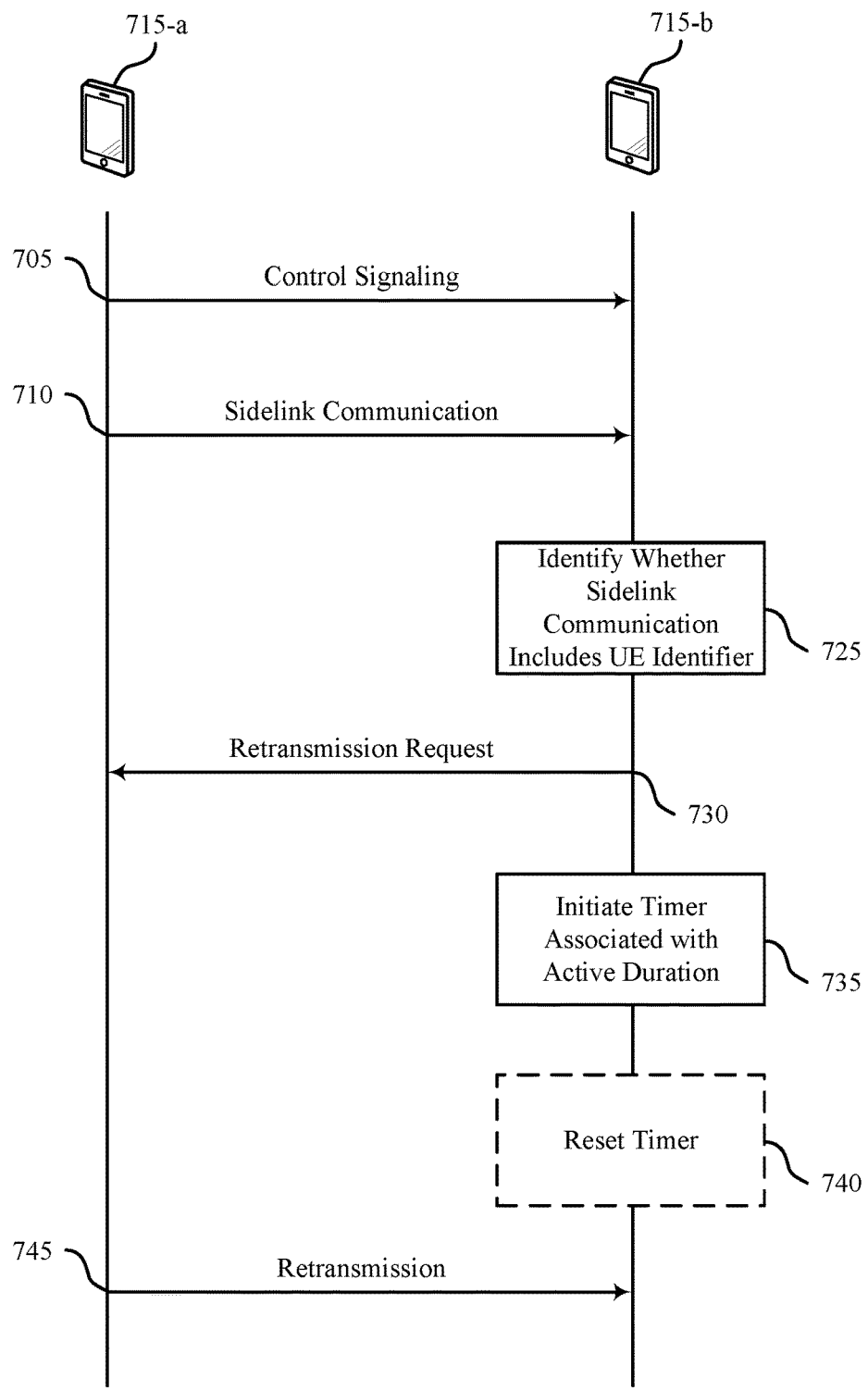

FIG. 7 illustrates an example of a process flow 700 that supports discontinuous reception operation for sidelink communications in accordance with aspects of the present disclosure. In some examples, the process flow 700 may implement aspects of wireless communications systems and timing diagrams as described herein. For example, process flow 700 may include UEs 715, which may be examples of UEs as described herein. In the following description of the process flow 700, the operations between the UEs 715 may be transmitted in a different order than the order shown, or the operations performed by the UEs 715 may be performed in different orders or at different times. Certain operations may also be left out of the process flow 700, or other operations may be added to the process flow 700. The process flow 700 may illustrate an example of a sidelink discontinuous reception procedure associated with receiving identifiers that identify UEs in sidelink communications.

At 705, the UE 715-b may receive control signaling indicating a configuration for performing a sidelink discontinuous reception procedure that is associated with receiving identifiers that identify UEs in sidelink communications, where the configuration indicates a duration of a timer associated with an active duration for the UE 715-b to receive sidelink retransmissions.

At 710, the UE 715-*b* may receive, from the UE 715-*a* based on receiving the control signaling indicating the configuration for performing the sidelink discontinuous reception procedure, a first sidelink communication including control information including at least a portion of an identifier of the UE 715-*a* and data including the identifier of the UE 715-*b*.

At 725, the UE 715-*b* may identify whether the sidelink communication (e.g., received from the UE 715-*a* at 710) is includes the identifier of the UE 715-*b*. That is, the sidelink communication may include data (e.g., received via a PSSCH) that includes an identifier of a UE 715 intended to be the recipient for the sidelink communication. At 725, the UE 715-*b* may compare the abbreviated identifier included in the control information of the sidelink communication received at 710 with the identifier of the UE 715-*b*. In cases that the abbreviated identifier does not match the identifier of the UE 715-*b*, the UE 715-*b* may not decode the data included in the sidelink communication.

In cases that the abbreviated identifier matches the identifier of the UE 715-*b*, the UE 715-*b* may additionally compare the identifier included in the data of the sidelink communication with the identifier of the UE 715-*b*. In cases that the identifier included in the data matches the identifier of the UE 715-*b*, the UE 715-*b* may determine that the sidelink communication is intended for the UE 715-*b*. In cases that the identifier included in the control information or the data of the sidelink communication is different from the identifier of the UE 715-*b*, the UE 715-*b* may determine that the sidelink communication is not intended for the UE 715-*b*.

At 730, the UE 715-*b* may transmit, to the UE 715-*a*, feedback requesting a retransmission of the data based on receiving the first sidelink communication and the data including the identifier of the UE 715-*b*. That is, in cases that the UE 715-*b* determines that the sidelink communication is intended for the UE 715-*b* and is unable to decode the data included in the sidelink communication, the UE 715-*b* may transmit feedback requesting the retransmission.

At 735, the UE 715-*b* may initiate the timer based on receiving the first sidelink communication. In one example, the UE 715-*b* may initiate the timer prior to identifying whether the sidelink communication includes the UE identifier at 725. That is, the UE 715-*b* may initiate the timer based on detecting the control information within the sidelink communication. Here, the UE 715-*b* may transmit the retransmission request at 730 after initiating the timer.

In another example, the UE 715-*b* may initiate the timer after identifying that the sidelink communication includes the UE identifier at 725. For example, the UE 715-*b* may initiate the timer based on identifying that the data includes the identifier of the UE 715-*b* (e.g., at 725) and a time indicated by the configuration for performing the sidelink discontinuous reception procedure. In some instances, the time indicated by the configuration corresponds to a first period of time after receiving the first sidelink communication, a second period of time after transmitting the feedback, or a combination thereof.

At 740, the UE 715-*b* may optionally reset the timer. That is, in cases that the UE 715-*b* initiates the timer (e.g., at 735) prior to determining whether the sidelink communication includes the UE identifier at 725, the UE 715-*b* may optionally reset the timer in cases that the UE 715-*b* identifies that the sidelink communication does not include the identifier of the UE 715-*b* (e.g., at 725).

At 745, the UE 715-*b* may receive, based on initiating the timer at 720 or 735, a second sidelink communication including the retransmission of the data.

Figure 8:
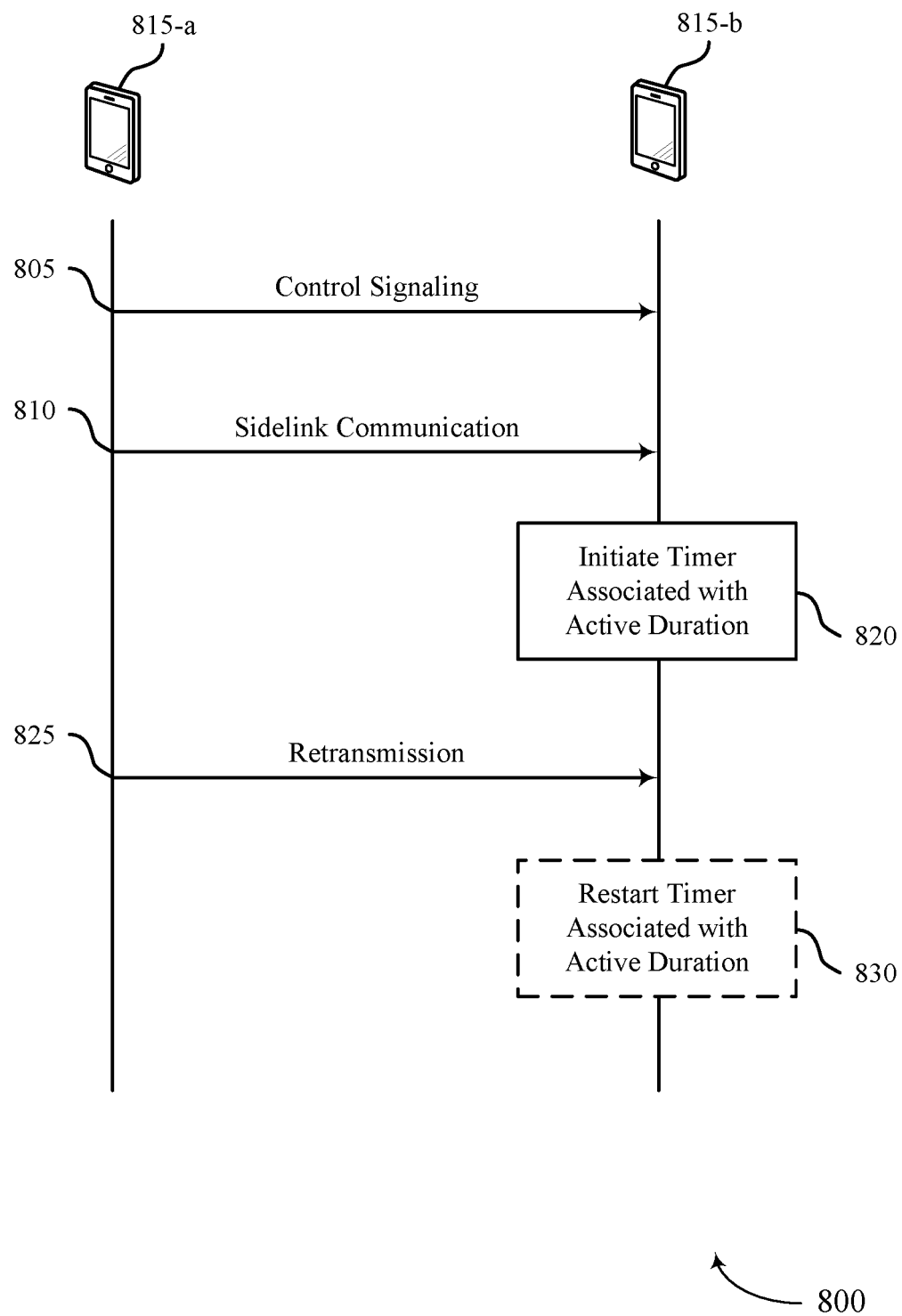

FIG. 8 illustrates an example of a process flow 800 that supports discontinuous reception operation for sidelink communications in accordance with aspects of the present disclosure. In some examples, the process flow 800 may implement aspects of wireless communications systems and timing diagrams as described herein. For example, process flow 800 may include UEs 815, which may be examples of UEs as described herein. In the following description of the process flow 800, the operations between the UEs 815 may be transmitted in a different order than the order shown, or the operations performed by the UEs 815 may be performed in different orders or at different times. Certain operations may also be left out of the process flow 800, or other operations may be added to the process flow 800. The process flow 800 may illustrate an example of a sidelink discontinuous reception procedure associated with blind retransmissions.

At 805, the UE 815-*b* may receive, from the UE 815-*a*, control signaling indicating a configuration for performing a sidelink discontinuous reception procedure that is associated with blind retransmissions for sidelink communications, where the configuration indicates a duration of a timer associated with an active duration for the first UE to receive the blind retransmissions during the sidelink discontinuous reception procedure.

At 810, the UE 815-*b* may receive, from the UE 815-*a*, a first sidelink communication including data based on receiving the configuration for performing the sidelink discontinuous reception procedure.

At 820, the UE 815-*b* may initiate the timer based on receiving the first sidelink communication. For example, the UE 715-*b* may determine, based on control information included in the sidelink communication, that the data in the first sidelink communication is associated with a new transmission. Here, the UE 715-*b* may initiate the timer based on the determination.

At 825, the UE 815-*b* may receive, based on initiating the timer, a second sidelink communication including a blind retransmission of the data.

At 830, the UE 815-*b* may optionally restart the timer in response to receiving the second sidelink communication including the blind retransmission of the data. That is, in other cases, the UE 815-*b* may refrain from restarting the timer after receiving the second sidelink communication based on the second sidelink communication including the blind retransmission of the data.

Figure 9:
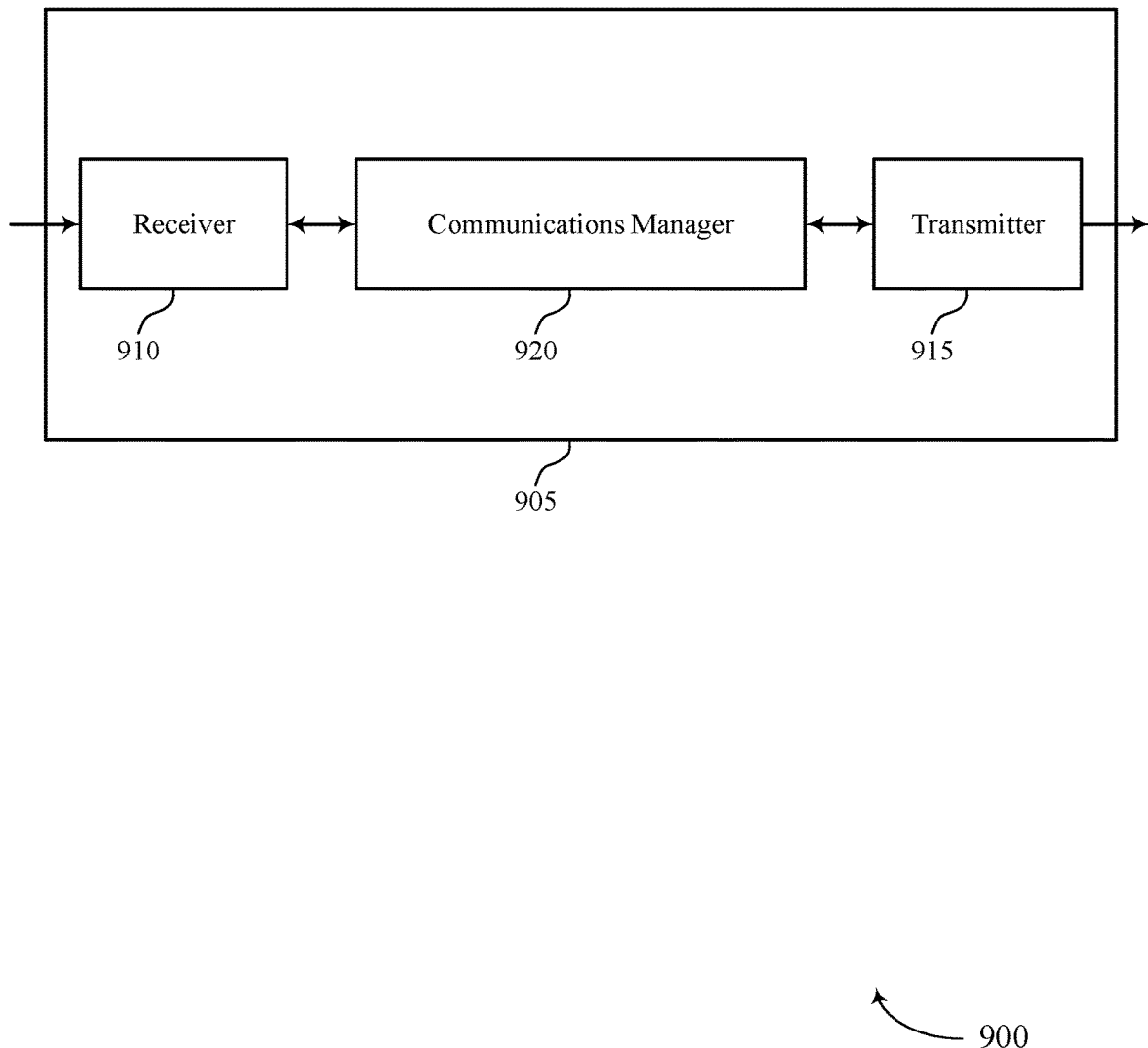
FIGS. 9 and 10 show block diagrams of devices that support discontinuous reception operation for sidelink communications in accordance with aspects of the present disclosure.

FIG. 9 shows a block diagram 900 of a device 905 that supports discontinuous reception operation for sidelink communications in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to discontinuous reception operation for sidelink communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to discontinuous reception operation for sidelink communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of discontinuous reception operation for sidelink communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first UE in accordance with examples as disclosed herein. For example, the communications manager 920 may be configured as or otherwise support a means for receiving control signaling indicating a configuration for performing a sidelink discontinuous reception procedure that is associated with a sidelink resource reservation procedure, where the configuration indicates a duration of a timer associated with an active duration for the first UE to receive sidelink retransmissions during the sidelink discontinuous reception procedure. The communications manager 920 may be configured as or otherwise support a means for receiving, from a second UE, a first sidelink communication including data based on receiving the control signaling indicating the configuration for performing the sidelink discontinuous reception procedure. The communications manager 920 may be configured as or otherwise support a means for transmitting, to the second UE, feedback requesting a retransmission of the data based on receiving the first sidelink communication. The communications manager 920 may be configured as or otherwise support a means for initiating the timer in response to transmitting the feedback based on receiving the first sidelink communication. The communications manager 920 may be configured as or otherwise support a means for receiving, based on initiating the timer, a second sidelink communication including the retransmission of the data, the second sidelink communication received via resources associated with the sidelink resource reservation procedure.

Additionally or alternatively, the communications manager 920 may support wireless communication at a first UE in accordance with examples as disclosed herein. For example, the communications manager 920 may be configured as or otherwise support a means for receiving control signaling indicating a configuration for performing a sidelink discontinuous reception procedure that is associated with receiving identifiers that identify UEs in sidelink communications, where the configuration indicates a duration of a timer associated with an active duration for the first UE to receive sidelink retransmissions. The communications manager 920 may be configured as or otherwise support a means for receiving, from a second UE based on receiving the control signaling indicating the configuration for performing the sidelink discontinuous reception procedure, a first sidelink communication including control information including at least a portion of an identifier of the first UE and data including the identifier of the first UE. The communications manager 920 may be configured as or otherwise support a means for transmitting, to the second UE, feedback requesting a retransmission of the data based on receiving the first sidelink communication and the data including the identifier of the first UE. The communications manager 920 may be configured as or otherwise support a means for initiating the timer based on receiving the first sidelink communication. The communications manager 920 may be configured as or otherwise support a means for receiving, based on initiating the timer, a second sidelink communication including the retransmission of the data.

Additionally or alternatively, the communications manager 920 may support wireless communication at a first UE in accordance with examples as disclosed herein. For example, the communications manager 920 may be configured as or otherwise support a means for receiving control signaling indicating a configuration for performing a sidelink discontinuous reception procedure that is associated with blind retransmissions for sidelink communications, where the configuration indicates a duration of a timer associated with an active duration for the first UE to receive the blind retransmissions during the sidelink discontinuous reception procedure. The communications manager 920 may be configured as or otherwise support a means for receiving, from a second UE, a first sidelink communication including data based on receiving the configuration for performing the sidelink discontinuous reception procedure. The communications manager 920 may be configured as or otherwise support a means for initiating the timer based on receiving the first sidelink communication. The communications manager 920 may be configured as or otherwise support a means for receiving, based on initiating the timer, a second sidelink communication including a blind retransmission of the data.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption (e.g., by decreasing an amount of time the device 905 is in an active state).

Figure 10:
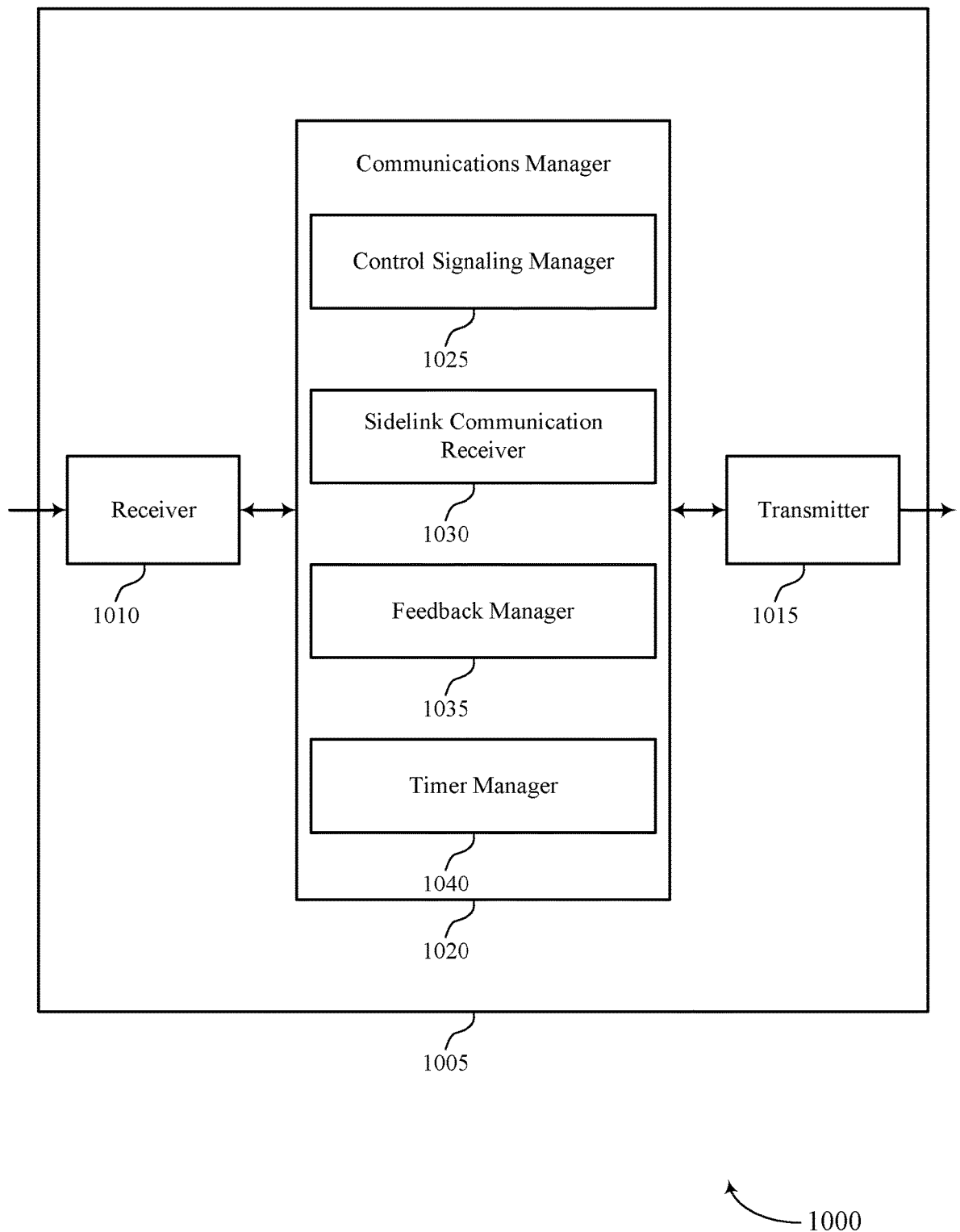

FIG. 10 shows a block diagram 1000 of a device 1005 that supports discontinuous reception operation for sidelink communications in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to discontinuous reception operation for sidelink communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to discontinuous reception operation for sidelink communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of discontinuous reception operation for sidelink communications as described herein. For example, the communications manager 1020 may include a control signaling manager 1025, a sidelink communication receiver 1030, a feedback manager 1035, a timer manager 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first UE in accordance with examples as disclosed herein. The control signaling manager 1025 may be configured as or otherwise support a means for receiving control signaling indicating a configuration for performing a sidelink discontinuous reception procedure that is associated with a sidelink resource reservation procedure, where the configuration indicates a duration of a timer associated with an active duration for the first UE to receive sidelink retransmissions during the sidelink discontinuous reception procedure. The sidelink communication receiver 1030 may be configured as or otherwise support a means for receiving, from a second UE, a first sidelink communication including data based on receiving the control signaling indicating the configuration for performing the sidelink discontinuous reception procedure. The feedback manager 1035 may be configured as or otherwise support a means for transmitting, to the second UE, feedback requesting a retransmission of the data based on receiving the first sidelink communication. The timer manager 1040 may be configured as or otherwise support a means for initiating the timer in response to transmitting the feedback based on receiving the first sidelink communication. The sidelink communication receiver 1030 may be configured as or otherwise support a means for receiving, based on initiating the timer, a second sidelink communication including the retransmission of the data, the second sidelink communication received via resources associated with the sidelink resource reservation procedure.

Additionally or alternatively, the communications manager 1020 may support wireless communication at a first UE in accordance with examples as disclosed herein. The control signaling manager 1025 may be configured as or otherwise support a means for receiving control signaling indicating a configuration for performing a sidelink discontinuous reception procedure that is associated with receiving identifiers that identify UEs in sidelink communications, where the configuration indicates a duration of a timer associated with an active duration for the first UE to receive sidelink retransmissions. The sidelink communication receiver 1030 may be configured as or otherwise support a means for receiving, from a second UE based on receiving the control signaling indicating the configuration for performing the sidelink discontinuous reception procedure, a first sidelink communication including control information including at least a portion of an identifier of the first UE and data including the identifier of the first UE. The feedback manager 1035 may be configured as or otherwise support a means for transmitting, to the second UE, feedback requesting a retransmission of the data based on receiving the first sidelink communication and the data including the identifier of the first UE. The timer manager 1040 may be configured as or otherwise support a means for initiating the timer based on receiving the first sidelink communication. The sidelink communication receiver 1030 may be configured as or otherwise support a means for receiving, based on initiating the timer, a second sidelink communication including the retransmission of the data.

Additionally or alternatively, the communications manager 1020 may support wireless communication at a first UE in accordance with examples as disclosed herein. The control signaling manager 1025 may be configured as or otherwise support a means for receiving control signaling indicating a configuration for performing a sidelink discontinuous reception procedure that is associated with blind retransmissions for sidelink communications, where the configuration indicates a duration of a timer associated with an active duration for the first UE to receive the blind retransmissions during the sidelink discontinuous reception procedure. The sidelink communication receiver 1030 may be configured as or otherwise support a means for receiving, from a second UE, a first sidelink communication including data based on receiving the configuration for performing the sidelink discontinuous reception procedure. The timer manager 1040 may be configured as or otherwise support a means for initiating the timer based on receiving the first sidelink communication. The sidelink communication receiver 1030 may be configured as or otherwise support a means for receiving, based on initiating the timer, a second sidelink communication including a blind retransmission of the data.

Figure 11:
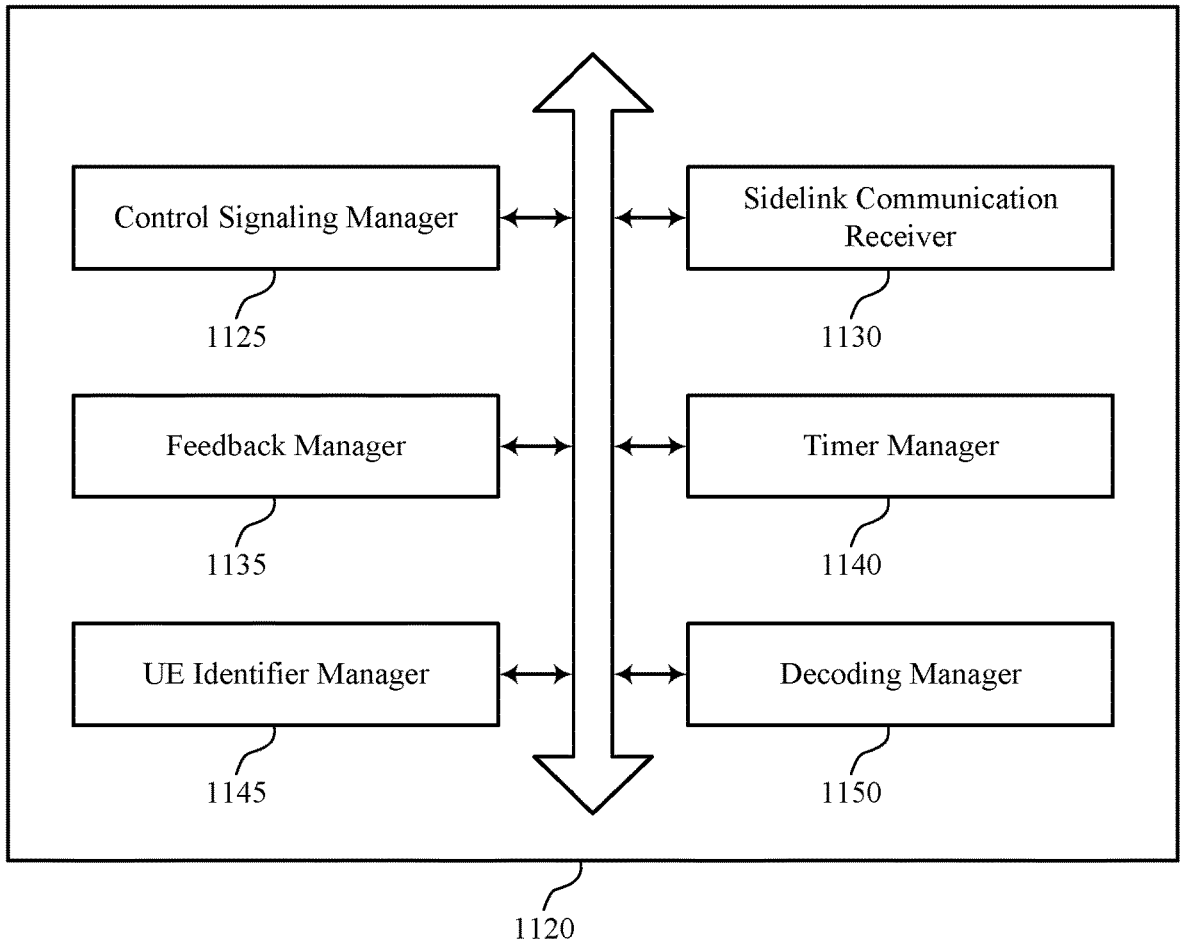
FIG. 11 shows a block diagram of a communications manager that supports discontinuous reception operation for sidelink communications in accordance with aspects of the present disclosure.

FIG. 11 shows a block diagram 1100 of a communications manager 1120 that supports discontinuous reception operation for sidelink communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of discontinuous reception operation for sidelink communications as described herein. For example, the communications manager 1120 may include a control signaling manager 1125, a sidelink communication receiver 1130, a feedback manager 1135, a timer manager 1140, a UE identifier manager 1145, a decoding manager 1150, or any combination thereof. Each of these components may communicate, directly or indirectly, with one another (e.g., via one or more buses).

The communications manager 1120 may support wireless communication at a first UE in accordance with examples as disclosed herein. The control signaling manager 1125 may be configured as or otherwise support a means for receiving control signaling indicating a configuration for performing a sidelink discontinuous reception procedure that is associated with a sidelink resource reservation procedure, where the configuration indicates a duration of a timer associated with an active duration for the first UE to receive sidelink retransmissions during the sidelink discontinuous reception procedure. The sidelink communication receiver 1130 may be configured as or otherwise support a means for receiving, from a second UE, a first sidelink communication including data based on receiving the control signaling indicating the configuration for performing the sidelink discontinuous reception procedure. The feedback manager 1135 may be configured as or otherwise support a means for transmitting, to the second UE, feedback requesting a retransmission of the data based on receiving the first sidelink communication. The timer manager 1140 may be configured as or otherwise support a means for initiating the timer in response to transmitting the feedback based on receiving the first sidelink communication. In some examples, the sidelink communication receiver 1130 may be configured as or otherwise support a means for receiving, based on initiating the timer, a second sidelink communication including the retransmission of the data, the second sidelink communication received via resources associated with the sidelink resource reservation procedure.

In some examples, the timer manager 1140 may be configured as or otherwise support a means for initiating, in response to transmitting the feedback, a second timer associated with an inactive duration for the first UE to receive sidelink transmissions during the sidelink discontinuous reception procedure, where initiating the timer associated with the active duration for the first UE is based on initiating the second timer.

In some examples, an expiration of the second timer triggers the initiating the timer associated with the active duration for the first UE.

In some examples, the timer manager 1140 may be configured as or otherwise support a means for identifying, from a first time associated with an expiration of the second timer and a second time indicated by the configuration for performing the sidelink discontinuous reception procedure corresponding to a period of time prior to the resources for receiving the second sidelink communication, a time for initiating the timer associated with the active duration for the first UE to receive sidelink retransmissions, where initiating the timer is based on the identifying.

In some examples, to support initiating the timer in response to transmitting the feedback, the timer manager 1140 may be configured as or otherwise support a means for initiating the timer at a time indicated by the configuration for performing the sidelink discontinuous reception procedure and based on the sidelink resource reservation procedure.

In some examples, the time indicated by the configuration corresponds to a period of time prior to the resources for receiving the second sidelink communication.

In some examples, the first sidelink communication includes control information indicating the resources associated with the sidelink resource reservation procedure for receiving the second sidelink communication.

In some examples, to support transmitting the feedback, the feedback manager 1135 may be configured as or otherwise support a means for transmitting a HARQ requesting the retransmission of the data based on failing to decode the data in the first sidelink communication.

Additionally or alternatively, the communications manager 1120 may support wireless communication at a first UE in accordance with examples as disclosed herein. In some examples, the control signaling manager 1125 may be configured as or otherwise support a means for receiving control signaling indicating a configuration for performing a sidelink discontinuous reception procedure that is associated with receiving identifiers that identify UEs in sidelink communications, where the configuration indicates a duration of a timer associated with an active duration for the first UE to receive sidelink retransmissions. In some examples, the sidelink communication receiver 1130 may be configured as or otherwise support a means for receiving, from a second UE based on receiving the control signaling indicating the configuration for performing the sidelink discontinuous reception procedure, a first sidelink communication including control information including at least a portion of an identifier of the first UE and data including the identifier of the first UE. In some examples, the feedback manager 1135 may be configured as or otherwise support a means for transmitting, to the second UE, feedback requesting a retransmission of the data based on receiving the first sidelink communication and the data including the identifier of the first UE. In some examples, the timer manager 1140 may be configured as or otherwise support a means for initiating the timer based on receiving the first sidelink communication. In some examples, the sidelink communication receiver 1130 may be configured as or otherwise support a means for receiving, based on initiating the timer, a second sidelink communication including the retransmission of the data.

In some examples, to support initiating the timer, the timer manager 1140 may be configured as or otherwise support a means for initiating, based on identifying that the data includes the identifier of the first UE, the timer at a time indicated by the configuration for performing the sidelink discontinuous reception procedure.

In some examples, the time indicated by the configuration corresponds to a first period of time after receiving the first sidelink communication, a second period of time after transmitting the feedback, or a combination thereof.

In some examples, the sidelink communication receiver 1130 may be configured as or otherwise support a means for receiving, from the second UE based on receiving the control signaling indicating the configuration for performing the sidelink discontinuous reception procedure, a third sidelink communication including second control information including at least a portion of a second identifier of a third UE and second data including the second identifier of the third UE. In some examples, the timer manager 1140 may be configured as or otherwise support a means for initiating the timer in response to detecting the second control information in the third sidelink communication. In some examples, the UE identifier manager 1145 may be configured as or otherwise support a means for identifying, based on initiating the timer and receiving the third sidelink communication, that the second identifier of the third UE is different from the identifier of the first UE. In some examples, the timer manager 1140 may be configured as or otherwise support a means for resetting the timer based on identifying that the second identifier of the third UE is different from the identifier of the first UE.

In some examples, to support initiating the timer, the timer manager 1140 may be configured as or otherwise support a means for initiating the timer in response to detecting the control information in the first sidelink communication, where transmitting the feedback is based on initiating the timer.

In some examples, the sidelink communication receiver 1130 may be configured as or otherwise support a means for receiving, from the second UE based on receiving the control signaling indicating the configuration for performing the sidelink discontinuous reception procedure, a third sidelink communication including second control information including at least a portion of a second identifier of a third UE. In some examples, the decoding manager 1150 may be configured as or otherwise support a means for refraining from decoding second data included in the third sidelink communication based on the portion of the second identifier of the third UE being different from the portion of the identifier of the first UE.

In some examples, the identifiers that identify UEs are MAC addresses identifying UEs in sidelink communications.

Additionally or alternatively, the communications manager 1120 may support wireless communication at a first UE in accordance with examples as disclosed herein. In some examples, the control signaling manager 1125 may be configured as or otherwise support a means for receiving control signaling indicating a configuration for performing a sidelink discontinuous reception procedure that is associated with blind retransmissions for sidelink communications, where the configuration indicates a duration of a timer associated with an active duration for the first UE to receive the blind retransmissions during the sidelink discontinuous reception procedure. In some examples, the sidelink communication receiver 1130 may be configured as or otherwise support a means for receiving, from a second UE, a first sidelink communication including data based on receiving the configuration for performing the sidelink discontinuous reception procedure. In some examples, the timer manager 1140 may be configured as or otherwise support a means for initiating the timer based on receiving the first sidelink communication. In some examples, the sidelink communication receiver 1130 may be configured as or otherwise support a means for receiving, based on initiating the timer, a second sidelink communication including a blind retransmission of the data.

In some examples, the timer manager 1140 may be configured as or otherwise support a means for restarting the timer in response to receiving the second sidelink communication including the blind retransmission of the data.

In some examples, the timer manager 1140 may be configured as or otherwise support a means for determining, based on control information included in the first sidelink communication, that the data in the first sidelink communication is associated with a new transmission, where initiating the timer is based on the data in the first sidelink communication being associated with the new transmission. In some examples, the timer manager 1140 may be configured as or otherwise support a means for refraining from restarting the timer after receiving the second sidelink communication based on the second sidelink communication including the blind retransmission of the data.

Figure 12:
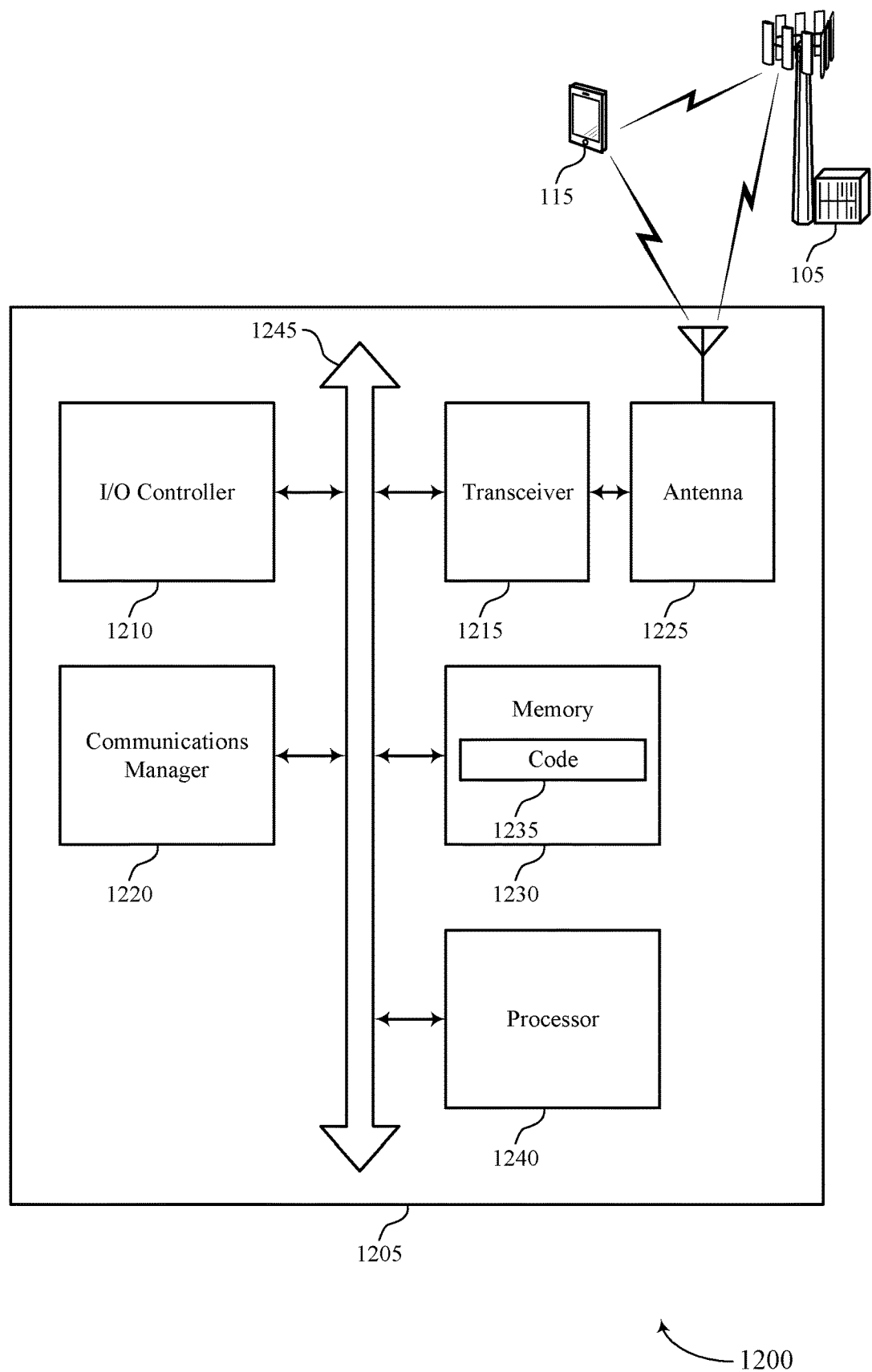
FIG. 12 shows a diagram of a system including a device that supports discontinuous reception operation for sidelink communications in accordance with aspects of the present disclosure.

FIG. 12 shows a diagram of a system 1200 including a device 1205 that supports discontinuous reception operation for sidelink communications in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting discontinuous reception operation for sidelink communications). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a first UE in accordance with examples as disclosed herein. For example, the communications manager 1220 may be configured as or otherwise support a means for receiving control signaling indicating a configuration for performing a sidelink discontinuous reception procedure that is associated with a sidelink resource reservation procedure, where the configuration indicates a duration of a timer associated with an active duration for the first UE to receive sidelink retransmissions during the sidelink discontinuous reception procedure. The communications manager 1220 may be configured as or otherwise support a means for receiving, from a second UE, a first sidelink communication including data based on receiving the control signaling indicating the configuration for performing the sidelink discontinuous reception procedure. The communications manager 1220 may be configured as or otherwise support a means for transmitting, to the second UE, feedback requesting a retransmission of the data based on receiving the first sidelink communication. The communications manager 1220 may be configured as or otherwise support a means for initiating the timer in response to transmitting the feedback based on receiving the first sidelink communication. The communications manager 1220 may be configured as or otherwise support a means for receiving, based on initiating the timer, a second sidelink communication including the retransmission of the data, the second sidelink communication received via resources associated with the sidelink resource reservation procedure.

Additionally or alternatively, the communications manager 1220 may support wireless communication at a first UE in accordance with examples as disclosed herein. For example, the communications manager 1220 may be configured as or otherwise support a means for receiving control signaling indicating a configuration for performing a sidelink discontinuous reception procedure that is associated with receiving identifiers that identify UEs in sidelink communications, where the configuration indicates a duration of a timer associated with an active duration for the first UE to receive sidelink retransmissions. The communications manager 1220 may be configured as or otherwise support a means for receiving, from a second UE based on receiving the control signaling indicating the configuration for performing the sidelink discontinuous reception procedure, a first sidelink communication including control information including at least a portion of an identifier of the first UE and data including the identifier of the first UE. The communications manager 1220 may be configured as or otherwise support a means for transmitting, to the second UE, feedback requesting a retransmission of the data based on receiving the first sidelink communication and the data including the identifier of the first UE. The communications manager 1220 may be configured as or otherwise support a means for initiating the timer based on receiving the first sidelink communication. The communications manager 1220 may be configured as or otherwise support a means for receiving, based on initiating the timer, a second sidelink communication including the retransmission of the data.

Additionally or alternatively, the communications manager 1220 may support wireless communication at a first UE in accordance with examples as disclosed herein. For example, the communications manager 1220 may be configured as or otherwise support a means for receiving control signaling indicating a configuration for performing a sidelink discontinuous reception procedure that is associated with blind retransmissions for sidelink communications, where the configuration indicates a duration of a timer associated with an active duration for the first UE to receive the blind retransmissions during the sidelink discontinuous reception procedure. The communications manager 1220 may be configured as or otherwise support a means for receiving, from a second UE, a first sidelink communication including data based on receiving the configuration for performing the sidelink discontinuous reception procedure. The communications manager 1220 may be configured as or otherwise support a means for initiating the timer based on receiving the first sidelink communication. The communications manager 1220 may be configured as or otherwise support a means for receiving, based on initiating the timer, a second sidelink communication including a blind retransmission of the data.

By including or configuring the communications manager 1220 in accordance with examples as described herein, the device 1205 may support techniques for reduced power consumption.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of discontinuous reception operation for sidelink communications as described herein, or the processor 1240 and the memory 1230 may be otherwise configured to perform or support such operations.

Figure 13:
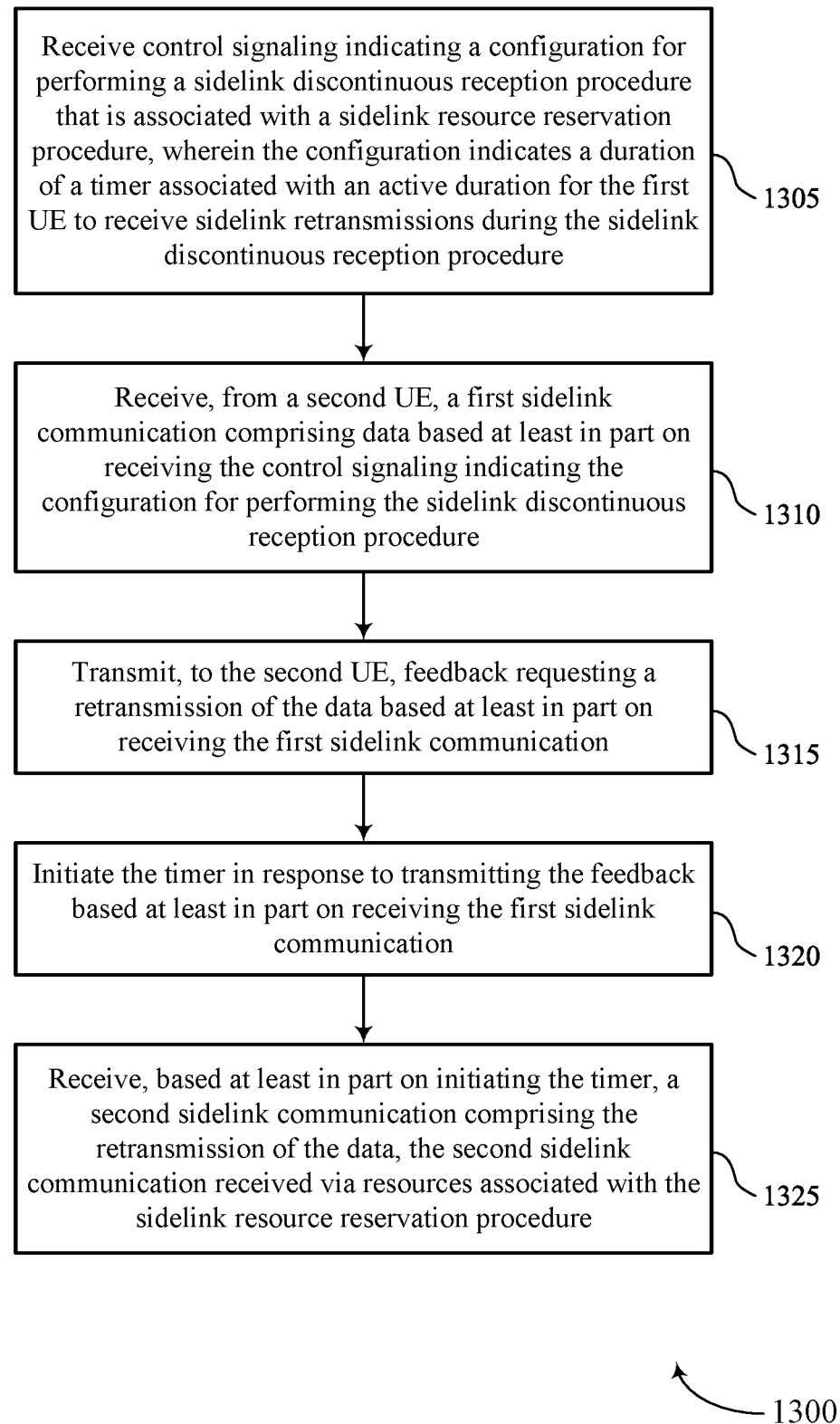
FIGS. 13 through 18 show flowcharts illustrating methods that support discontinuous reception operation for sidelink communications in accordance with aspects of the present disclosure.

FIG. 13 shows a flowchart illustrating a method 1300 that supports discontinuous reception operation for sidelink communications in accordance with aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating a configuration for performing a sidelink discontinuous reception procedure that is associated with a sidelink resource reservation procedure, where the configuration indicates a duration of a timer associated with an active duration for the first UE to receive sidelink retransmissions during the sidelink discontinuous reception procedure. The operations of 1305 may be performed in accordance with examples as disclosed herein. In some examples, aspects of the operations of 1305 may be performed by a control signaling manager 1125 as described with reference to FIG. 11.

At 1310, the method may include receiving, from a second UE, a first sidelink communication including data based on receiving the control signaling indicating the configuration for performing the sidelink discontinuous reception procedure. The operations of 1310 may be performed in accordance with examples as disclosed herein. In some examples, aspects of the operations of 1310 may be performed by a sidelink communication receiver 1130 as described with reference to FIG. 11.

At 1315, the method may include transmitting, to the second UE, feedback requesting a retransmission of the data based on receiving the first sidelink communication. The operations of 1315 may be performed in accordance with examples as disclosed herein. In some examples, aspects of the operations of 1315 may be performed by a feedback manager 1135 as described with reference to FIG. 11.

At 1320, the method may include initiating the timer in response to transmitting the feedback based on receiving the first sidelink communication. The operations of 1320 may be performed in accordance with examples as disclosed herein. In some examples, aspects of the operations of 1320 may be performed by a timer manager 1140 as described with reference to FIG. 11.

At 1325, the method may include receiving, based on initiating the timer, a second sidelink communication including the retransmission of the data, the second sidelink communication received via resources associated with the sidelink resource reservation procedure. The operations of 1325 may be performed in accordance with examples as disclosed herein. In some examples, aspects of the operations of 1325 may be performed by a sidelink communication receiver 1130 as described with reference to FIG. 11.

Figure 14:
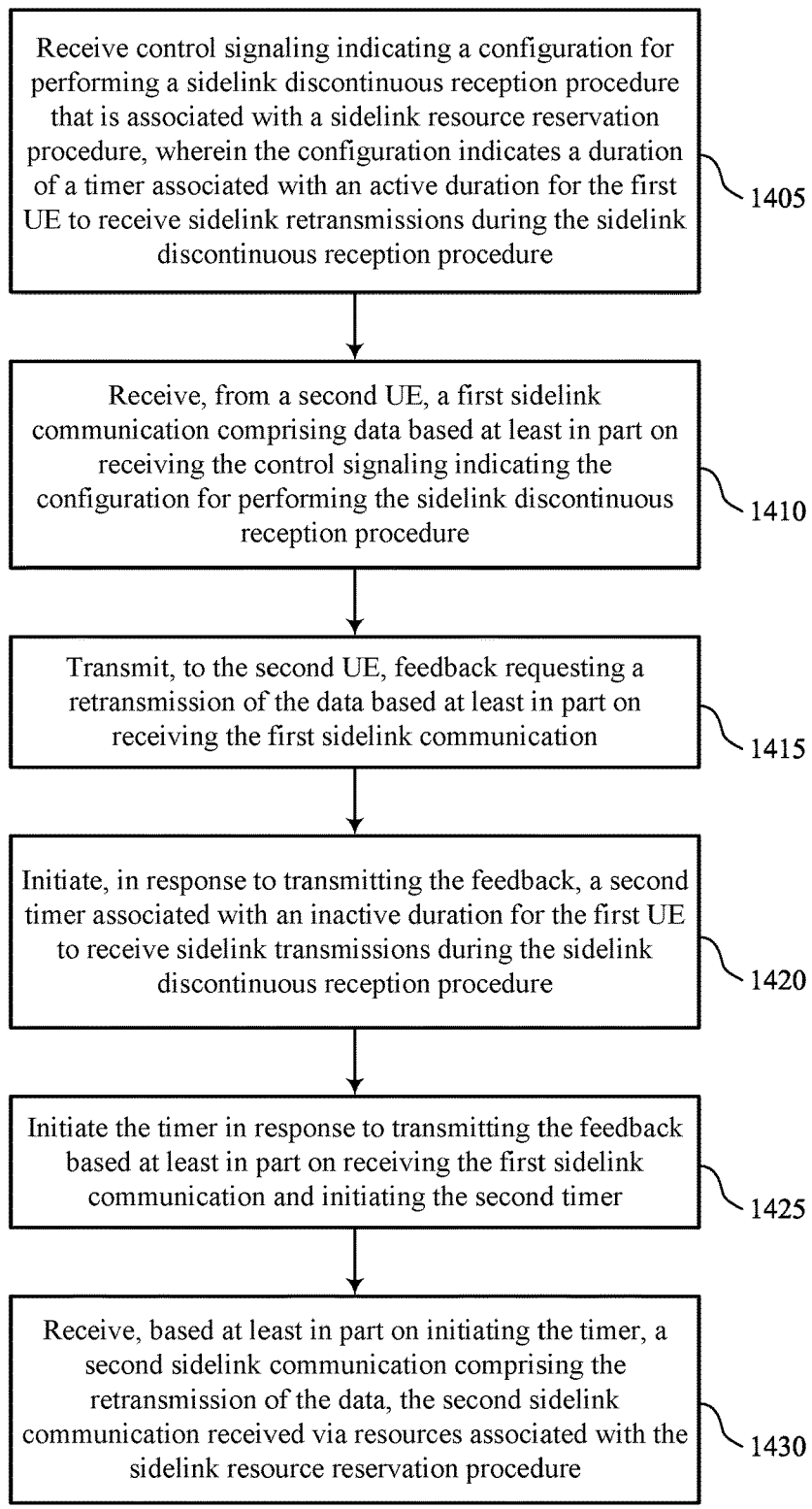

FIG. 14 shows a flowchart illustrating a method 1400 that supports discontinuous reception operation for sidelink communications in accordance with aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1405, the method may include receiving control signaling indicating a configuration for performing a sidelink discontinuous reception procedure that is associated with a sidelink resource reservation procedure, where the configuration indicates a duration of a timer associated with an active duration for the first UE to receive sidelink retransmissions during the sidelink discontinuous reception procedure. The operations of 1405 may be performed in accordance with examples as disclosed herein. In some examples, aspects of the operations of 1405 may be performed by a control signaling manager 1125 as described with reference to FIG. 11.

At 1410, the method may include receiving, from a second UE, a first sidelink communication including data based on receiving the control signaling indicating the configuration for performing the sidelink discontinuous reception procedure. The operations of 1410 may be performed in accordance with examples as disclosed herein. In some examples, aspects of the operations of 1410 may be performed by a sidelink communication receiver 1130 as described with reference to FIG. 11.

At 1415, the method may include transmitting, to the second UE, feedback requesting a retransmission of the data based on receiving the first sidelink communication. The operations of 1415 may be performed in accordance with examples as disclosed herein. In some examples, aspects of the operations of 1415 may be performed by a feedback manager 1135 as described with reference to FIG. 11.

At 1420, the method may include initiating, in response to transmitting the feedback, a second timer associated with an inactive duration for the first UE to receive sidelink transmissions during the sidelink discontinuous reception procedure. The operations of 1420 may be performed in accordance with examples as disclosed herein. In some examples, aspects of the operations of 1420 may be performed by a timer manager 1140 as described with reference to FIG. 11.

At 1425, the method may include initiating the timer in response to transmitting the feedback based on receiving the first sidelink communication and initiating the second timer. The operations of 1425 may be performed in accordance with examples as disclosed herein. In some examples, aspects of the operations of 1425 may be performed by a timer manager 1140 as described with reference to FIG. 11.

At 1430, the method may include receiving, based on initiating the timer, a second sidelink communication including the retransmission of the data, the second sidelink communication received via resources associated with the sidelink resource reservation procedure. The operations of 1430 may be performed in accordance with examples as disclosed herein. In some examples, aspects of the operations of 1430 may be performed by a sidelink communication receiver 1130 as described with reference to FIG. 11.

Figure 15:
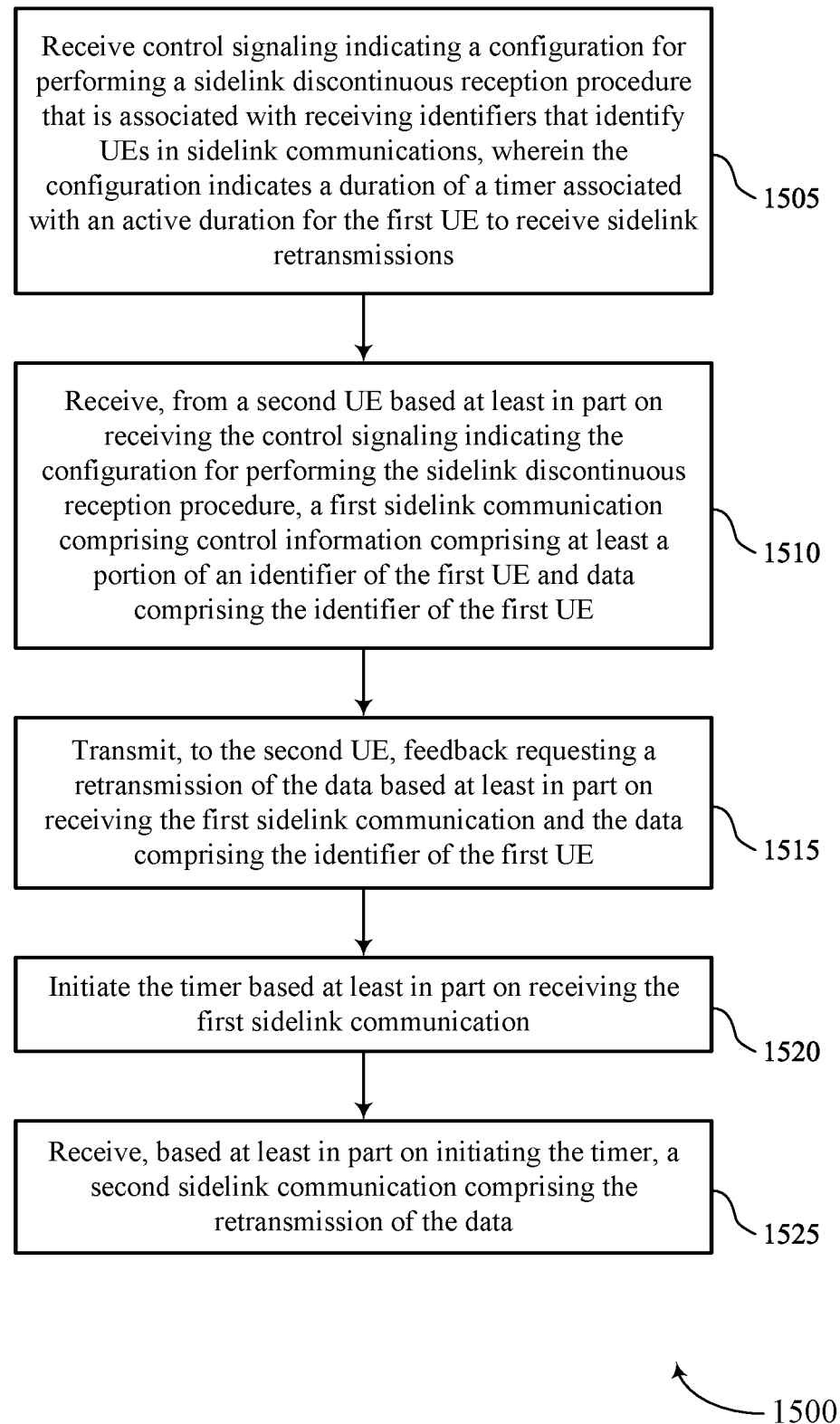

FIG. 15 shows a flowchart illustrating a method 1500 that supports discontinuous reception operation for sidelink communications in accordance with aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1505, the method may include receiving control signaling indicating a configuration for performing a sidelink discontinuous reception procedure that is associated with receiving identifiers that identify UEs in sidelink communications, where the configuration indicates a duration of a timer associated with an active duration for the first UE to receive sidelink retransmissions. The operations of 1505 may be performed in accordance with examples as disclosed herein. In some examples, aspects of the operations of 1505 may be performed by a control signaling manager 1125 as described with reference to FIG. 11.

At 1510, the method may include receiving, from a second UE based on receiving the control signaling indicating the configuration for performing the sidelink discontinuous reception procedure, a first sidelink communication including control information including at least a portion of an identifier of the first UE and data including the identifier of the first UE. The operations of 1510 may be performed in accordance with examples as disclosed herein. In some examples, aspects of the operations of 1510 may be performed by a sidelink communication receiver 1130 as described with reference to FIG. 11.

At 1515, the method may include transmitting, to the second UE, feedback requesting a retransmission of the data based on receiving the first sidelink communication and the data including the identifier of the first UE. The operations of 1515 may be performed in accordance with examples as disclosed herein. In some examples, aspects of the operations of 1515 may be performed by a feedback manager 1135 as described with reference to FIG. 11.

At 1520, the method may include initiating the timer based on receiving the first sidelink communication. The operations of 1520 may be performed in accordance with examples as disclosed herein. In some examples, aspects of the operations of 1520 may be performed by a timer manager 1140 as described with reference to FIG. 11.

At 1525, the method may include receiving, based on initiating the timer, a second sidelink communication including the retransmission of the data. The operations of 1525 may be performed in accordance with examples as disclosed herein. In some examples, aspects of the operations of 1525 may be performed by a sidelink communication receiver 1130 as described with reference to FIG. 11.

Figure 16:
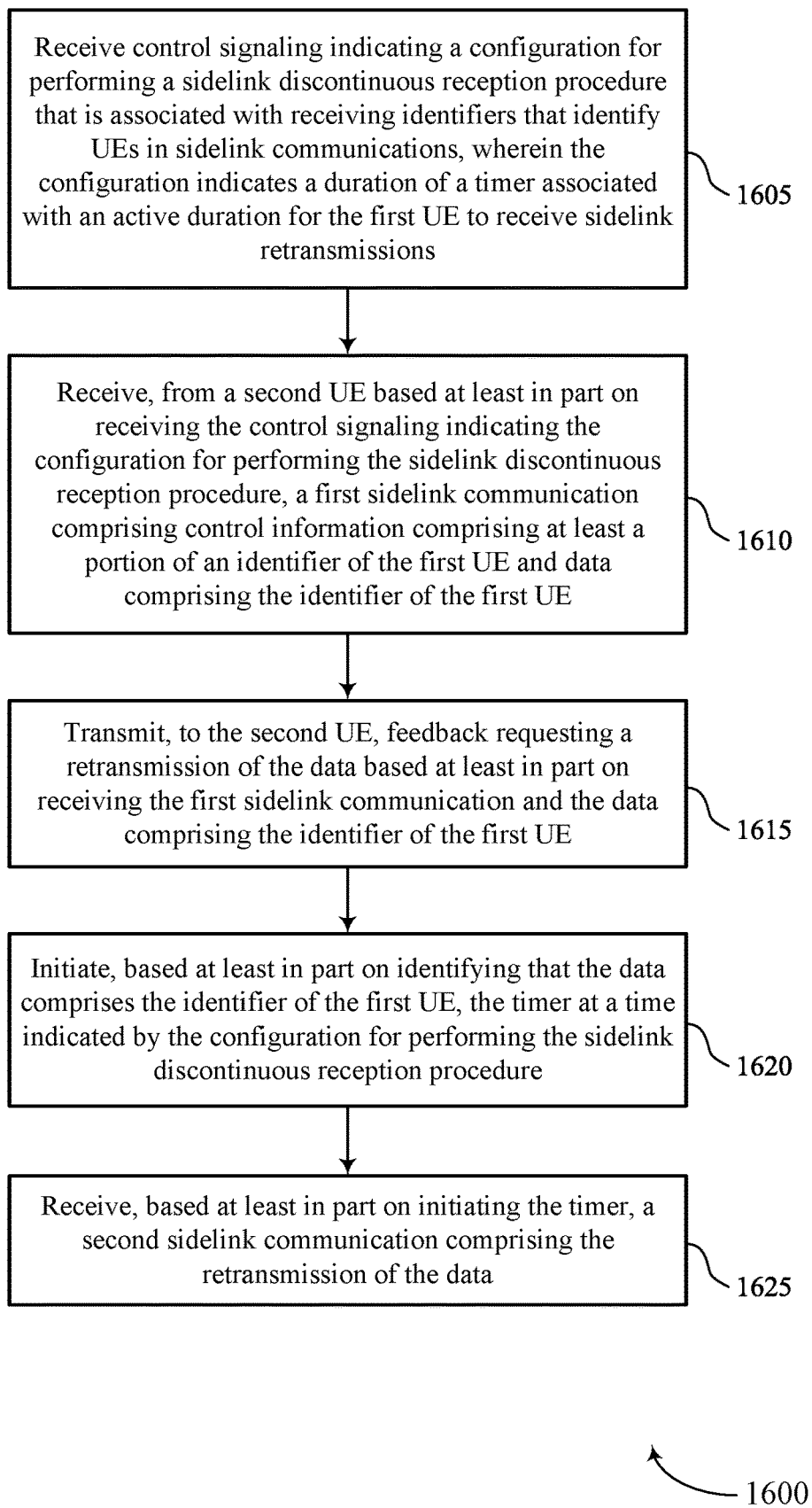

FIG. 16 shows a flowchart illustrating a method 1600 that supports discontinuous reception operation for sidelink communications in accordance with aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1605, the method may include receiving control signaling indicating a configuration for performing a sidelink discontinuous reception procedure that is associated with receiving identifiers that identify UEs in sidelink communications, where the configuration indicates a duration of a timer associated with an active duration for the first UE to receive sidelink retransmissions. The operations of 1605 may be performed in accordance with examples as disclosed herein. In some examples, aspects of the operations of 1605 may be performed by a control signaling manager 1125 as described with reference to FIG. 11.

At 1610, the method may include receiving, from a second UE based on receiving the control signaling indicating the configuration for performing the sidelink discontinuous reception procedure, a first sidelink communication including control information including at least a portion of an identifier of the first UE and data including the identifier of the first UE. The operations of 1610 may be performed in accordance with examples as disclosed herein. In some examples, aspects of the operations of 1610 may be performed by a sidelink communication receiver 1130 as described with reference to FIG. 11.

At 1615, the method may include transmitting, to the second UE, feedback requesting a retransmission of the data based on receiving the first sidelink communication and the data including the identifier of the first UE. The operations of 1615 may be performed in accordance with examples as disclosed herein. In some examples, aspects of the operations of 1615 may be performed by a feedback manager 1135 as described with reference to FIG. 11.

At 1620, the method may include initiating, based on identifying that the data includes the identifier of the first UE, the timer at a time indicated by the configuration for performing the sidelink discontinuous reception procedure. The operations of 1620 may be performed in accordance with examples as disclosed herein. In some examples, aspects of the operations of 1620 may be performed by a timer manager 1140 as described with reference to FIG. 11.

At 1625, the method may include receiving, based on initiating the timer, a second sidelink communication including the retransmission of the data. The operations of 1625 may be performed in accordance with examples as disclosed herein. In some examples, aspects of the operations of 1625 may be performed by a sidelink communication receiver 1130 as described with reference to FIG. 11.

Figure 17:
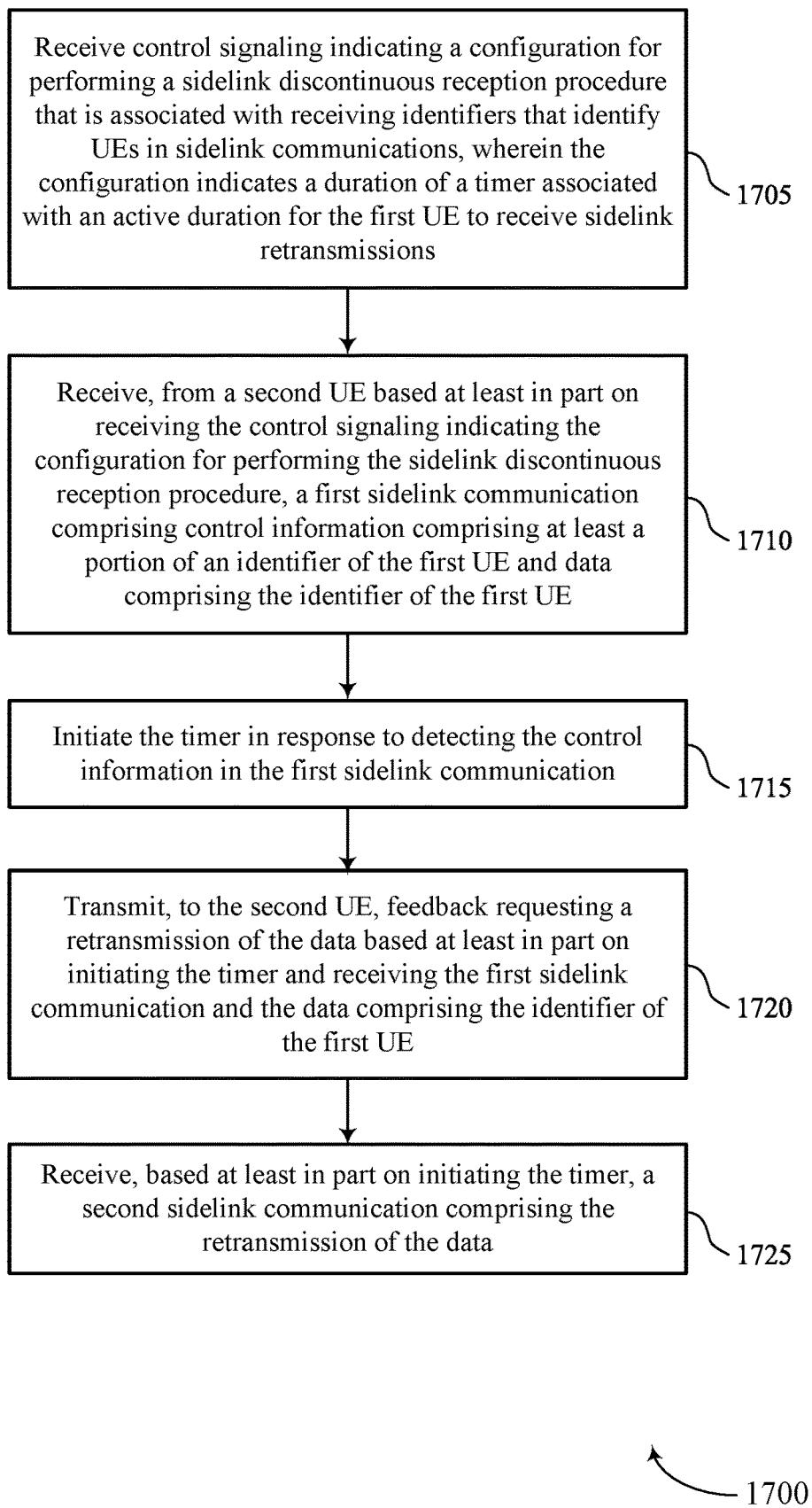

FIG. 17 shows a flowchart illustrating a method 1700 that supports discontinuous reception operation for sidelink communications in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include receiving control signaling indicating a configuration for performing a sidelink discontinuous reception procedure that is associated with receiving identifiers that identify UEs in sidelink communications, where the configuration indicates a duration of a timer associated with an active duration for the first UE to receive sidelink retransmissions. The operations of 1705 may be performed in accordance with examples as disclosed herein. In some examples, aspects of the operations of 1705 may be performed by a control signaling manager 1125 as described with reference to FIG. 11.

At 1710, the method may include receiving, from a second UE based on receiving the control signaling indicating the configuration for performing the sidelink discontinuous reception procedure, a first sidelink communication including control information including at least a portion of an identifier of the first UE and data including the identifier of the first UE. The operations of 1710 may be performed in accordance with examples as disclosed herein. In some examples, aspects of the operations of 1710 may be performed by a sidelink communication receiver 1130 as described with reference to FIG. 11.

At 1715, the method may include initiating the timer in response to detecting the control information in the first sidelink communication. The operations of 1715 may be performed in accordance with examples as disclosed herein. In some examples, aspects of the operations of 1715 may be performed by a timer manager 1140 as described with reference to FIG. 11.

At 1720, the method may include transmitting, to the second UE, feedback requesting a retransmission of the data based on initiating the timer and receiving the first sidelink communication and the data including the identifier of the first UE. The operations of 1720 may be performed in accordance with examples as disclosed herein. In some examples, aspects of the operations of 1720 may be performed by a feedback manager 1135 as described with reference to FIG. 11.

At 1725, the method may include receiving, based on initiating the timer, a second sidelink communication including the retransmission of the data. The operations of 1725 may be performed in accordance with examples as disclosed herein. In some examples, aspects of the operations of 1725 may be performed by a sidelink communication receiver 1130 as described with reference to FIG. 11.

Figure 18:
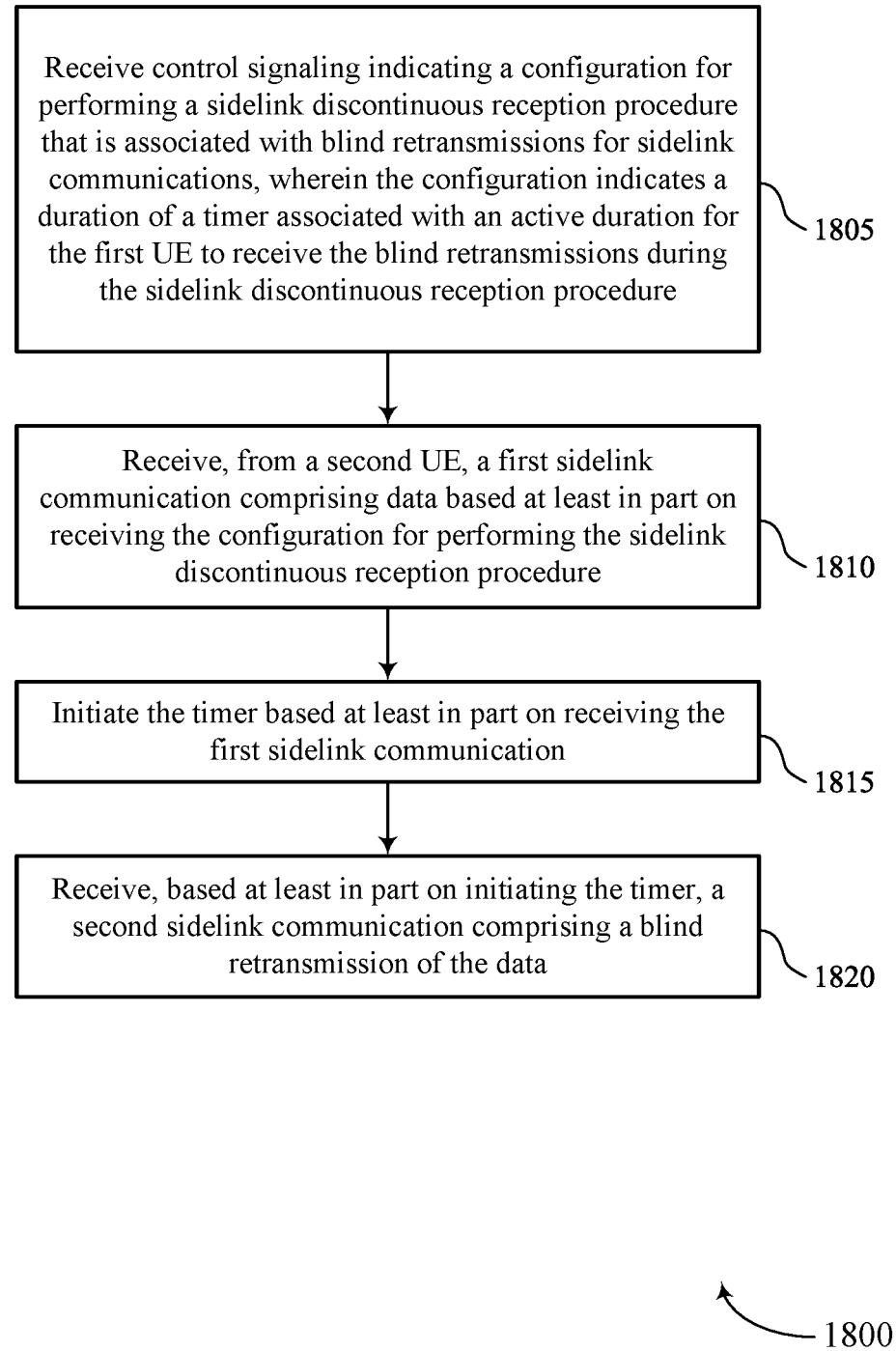

FIG. 18 shows a flowchart illustrating a method 1800 that supports discontinuous reception operation for sidelink communications in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include receiving control signaling indicating a configuration for performing a sidelink discontinuous reception procedure that is associated with blind retransmissions for sidelink communications, where the configuration indicates a duration of a timer associated with an active duration for the first UE to receive the blind retransmissions during the sidelink discontinuous reception procedure. The operations of 1805 may be performed in accordance with examples as disclosed herein. In some examples, aspects of the operations of 1805 may be performed by a control signaling manager 1125 as described with reference to FIG. 11.

At 1810, the method may include receiving, from a second UE, a first sidelink communication including data based on receiving the configuration for performing the sidelink discontinuous reception procedure. The operations of 1810 may be performed in accordance with examples as disclosed herein. In some examples, aspects of the operations of 1810 may be performed by a sidelink communication receiver 1130 as described with reference to FIG. 11.

At 1815, the method may include initiating the timer based on receiving the first sidelink communication. The operations of 1815 may be performed in accordance with examples as disclosed herein. In some examples, aspects of the operations of 1815 may be performed by a timer manager 1140 as described with reference to FIG. 11.

At 1820, the method may include receiving, based on initiating the timer, a second sidelink communication including a blind retransmission of the data. The operations of 1820 may be performed in accordance with examples as disclosed herein. In some examples, aspects of the operations of 1820 may be performed by a sidelink communication receiver 1130 as described with reference to FIG. 11.

The following provides an overview of aspects of the present disclosure:

Aspect 1: A method for wireless communication at a first UE, comprising: receiving control signaling indicating a configuration for performing a sidelink discontinuous reception procedure that is associated with a sidelink resource reservation procedure, wherein the configuration indicates a duration of a timer associated with an active duration for the first UE to receive sidelink retransmissions during the sidelink discontinuous reception procedure; receiving, from a second UE, a first sidelink communication comprising data based at least in part on receiving the control signaling indicating the configuration for performing the sidelink discontinuous reception procedure; transmitting, to the second UE, feedback requesting a retransmission of the data based at least in part on receiving the first sidelink communication; initiating the timer in response to transmitting the feedback based at least in part on receiving the first sidelink communication; and receiving, based at least in part on initiating the timer, a second sidelink communication comprising the retransmission of the data, the second sidelink communication received via resources associated with the sidelink resource reservation procedure.

Aspect 2: The method of aspect 1, further comprising: initiating, in response to transmitting the feedback, a second timer associated with an inactive duration for the first UE to receive sidelink transmissions during the sidelink discontinuous reception procedure, wherein initiating the timer associated with the active duration for the first UE is based at least in part on initiating the second timer.

Aspect 3: The method of aspect 2, wherein an expiration of the second timer triggers the initiating the timer associated with the active duration for the first UE.

Aspect 4: The method of any of aspects 2 through 3, further comprising: identifying, from a first time associated with an expiration of the second timer and a second time indicated by the configuration for performing the sidelink discontinuous reception procedure corresponding to a period of time prior to the resources for receiving the second sidelink communication, a time for initiating the timer associated with the active duration for the first UE to receive sidelink retransmissions, wherein initiating the timer is based at least in part on the identifying.

Aspect 5: The method of any of aspects 1 through 4, wherein initiating the timer in response to transmitting the feedback further comprises: initiating the timer at a time indicated by the configuration for performing the sidelink discontinuous reception procedure and based at least in part on the sidelink resource reservation procedure.

Aspect 6: The method of aspect 5, wherein the time indicated by the configuration corresponds to a period of time prior to the resources for receiving the second sidelink communication.

Aspect 7: The method of any of aspects 1 through 6, wherein the first sidelink communication comprises control information indicating the resources associated with the sidelink resource reservation procedure for receiving the second sidelink communication.

Aspect 8: The method of any of aspects 1 through 7, wherein transmitting the feedback comprises: transmitting a HARQ requesting the retransmission of the data based at least in part on failing to decode the data in the first sidelink communication.

Aspect 9: A method for wireless communication at a first UE, comprising: receiving control signaling indicating a configuration for performing a sidelink discontinuous reception procedure that is associated with receiving identifiers that identify UEs in sidelink communications, wherein the configuration indicates a duration of a timer associated with an active duration for the first UE to receive sidelink retransmissions; receiving, from a second UE based at least in part on receiving the control signaling indicating the configuration for performing the sidelink discontinuous reception procedure, a first sidelink communication comprising control information comprising at least a portion of an identifier of the first UE and data comprising the identifier of the first UE; transmitting, to the second UE, feedback requesting a retransmission of the data based at least in part on receiving the first sidelink communication and the data comprising the identifier of the first UE; initiating the timer based at least in part on receiving the first sidelink communication; and receiving, based at least in part on initiating the timer, a second sidelink communication comprising the retransmission of the data.

Aspect 10: The method of aspect 9, wherein initiating the timer comprises: initiating, based at least in part on identifying that the data comprises the identifier of the first UE, the timer at a time indicated by the configuration for performing the sidelink discontinuous reception procedure.

Aspect 11: The method of aspect 10, wherein the time indicated by the configuration corresponds to a first period of time after receiving the first sidelink communication, a second period of time after transmitting the feedback, or a combination thereof.

Aspect 12: The method of any of aspects 9 through 11, further comprising: receiving, from the second UE based at least in part on receiving the control signaling indicating the configuration for performing the sidelink discontinuous reception procedure, a third sidelink communication comprising second control information comprising at least a portion of a second identifier of a third UE and second data comprising the second identifier of the third UE; initiating the timer in response to detecting the second control information in the third sidelink communication; identifying, based at least in part on initiating the timer and receiving the third sidelink communication, that the second identifier of the third UE is different from the identifier of the first UE; and resetting the timer based at least in part on identifying that the second identifier of the third UE is different from the identifier of the first UE.

Aspect 13: The method of any of aspects 9 through 12, wherein initiating the timer comprises: initiating the timer in response to detecting the control information in the first sidelink communication, wherein transmitting the feedback is based at least in part on initiating the timer.

Aspect 14: The method of any of aspects 9 through 13, further comprising: receiving, from the second UE based at least in part on receiving the control signaling indicating the configuration for performing the sidelink discontinuous reception procedure, a third sidelink communication comprising second control information comprising at least a portion of a second identifier of a third UE; and refraining from decoding second data included in the third sidelink communication based at least in part on the portion of the second identifier of the third UE being different from the portion of the identifier of the first UE.

Aspect 15: The method of any of aspects 9 through 14, wherein the identifiers that identify UEs are MAC addresses identifying UEs in sidelink communications.

Aspect 16: A method for wireless communication at a first UE, comprising: receiving control signaling indicating a configuration for performing a sidelink discontinuous reception procedure that is associated with blind retransmissions for sidelink communications, wherein the configuration indicates a duration of a timer associated with an active duration for the first UE to receive the blind retransmissions during the sidelink discontinuous reception procedure; receiving, from a second UE, a first sidelink communication comprising data based at least in part on receiving the configuration for performing the sidelink discontinuous reception procedure; initiating the timer based at least in part on receiving the first sidelink communication; and receiving, based at least in part on initiating the timer, a second sidelink communication comprising a blind retransmission of the data.

Aspect 17: The method of aspect 16, further comprising: restarting the timer in response to receiving the second sidelink communication comprising the blind retransmission of the data.

Aspect 18: The method of any of aspects 16 through 17, further comprising: determining, based at least in part on control information included in the first sidelink communication, that the data in the first sidelink communication is associated with a new transmission, wherein initiating the timer is based at least in part on the data in the first sidelink communication being associated with the new transmission; and refraining from restarting the timer after receiving the second sidelink communication based at least in part on the second sidelink communication including the blind retransmission of the data.

Aspect 19: An apparatus for wireless communication at a first UE, comprising a processor; memory coupled with the processor; and instructions stored in the memory and executable by the processor to cause the apparatus to perform a method of any of aspects 1 through 8.

Aspect 20: An apparatus for wireless communication at a first UE, comprising at least one means for performing a method of any of aspects 1 through 8.

Aspect 21: A non-transitory computer-readable medium storing code for wireless communication at a first UE, the code comprising instructions executable by a processor to perform a method of any of aspects 1 through 8.

Aspect 22: An apparatus for wireless communication at a first UE, comprising a processor; memory coupled with the processor; and instructions stored in the memory and executable by the processor to cause the apparatus to perform a method of any of aspects 9 through 15.

Aspect 23: An apparatus for wireless communication at a first UE, comprising at least one means for performing a method of any of aspects 9 through 15.

Aspect 24: A non-transitory computer-readable medium storing code for wireless communication at a first UE, the code comprising instructions executable by a processor to perform a method of any of aspects 9 through 15.

Aspect 25: An apparatus for wireless communication at a first UE, comprising a processor; memory coupled with the processor; and instructions stored in the memory and executable by the processor to cause the apparatus to perform a method of any of aspects 16 through 18.

Aspect 26: An apparatus for wireless communication at a first UE, comprising at least one means for performing a method of any of aspects 16 through 18.

Aspect 27: A non-transitory computer-readable medium storing code for wireless communication at a first UE, the code comprising instructions executable by a processor to perform a method of any of aspects 16 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
receiving first sidelink control information indicating a configuration for performing a sidelink discontinuous reception procedure that is associated with a sidelink resource reservation procedure, wherein the configuration indicates a duration of a timer associated with an active duration for the first UE to receive sidelink retransmissions during the sidelink discontinuous reception procedure;
receiving second sidelink control information indicating an explicit indication of an initiation time of the timer, wherein the explicit indication of the initiation time comprises an explicit indication of a quantity of slots starting at a first slot of resources associated with a second sidelink communication and extending prior to the first slot of resources associated with the second sidelink communication;
receiving, from a second UE, a first sidelink communication comprising data based at least in part on receiving the first sidelink control information indicating the configuration for performing the sidelink discontinuous reception procedure;
transmitting, to the second UE, feedback requesting a retransmission of the data based at least in part on receiving the first sidelink communication;
initiating the timer at the initiation time in response to transmitting the feedback based at least in part on the explicit indication of the initiation time, wherein the second sidelink communication comprises the retransmission of the data; and
receiving, during the resources associated with the second sidelink communication and based at least in part on initiating the timer prior to the resources associated with the second sidelink communication, the second sidelink communication comprising the retransmission of the data, the second sidelink communication received via resources associated with the sidelink resource reservation procedure.

2. The method of claim 1, wherein the initiation time is indicated by the configuration for performing the sidelink discontinuous reception procedure and is based at least in part on the sidelink resource reservation procedure.

3. The method of claim 1, wherein the initiation time is indicated by the second sidelink control information associated with a sidelink communication and different from the first sidelink control information.

4. The method of claim 1, wherein the first sidelink communication comprises control information indicating the resources associated with the sidelink resource reservation procedure for receiving the second sidelink communication.

5. The method of claim 1, wherein transmitting the feedback comprises:
transmitting a hybrid automatic repeat request requesting the retransmission of the data based at least in part on failing to decode the data in the first sidelink communication.

6. A method for wireless communication at a first user equipment (UE), comprising:
receiving first sidelink control information indicating a configuration for performing a sidelink discontinuous reception procedure that is associated with receiving identifiers that identify UEs in sidelink communications, wherein the configuration indicates a duration of a timer associated with an active duration for the first UE to receive sidelink retransmissions;
receiving, from a second UE based at least in part on receiving the first sidelink control information indicating the configuration for performing the sidelink discontinuous reception procedure, a first sidelink communication comprising control information comprising at least a portion of a second identifier of a third UE that is different from an identifier of the first UE and data comprising the second identifier of the third UE;
transmitting, to the second UE, feedback requesting a retransmission of the data based at least in part on receiving the first sidelink communication and in accordance with the data comprising the identifier of the first UE;
initiating the timer based at least in part on receiving the first sidelink communication;
identifying, based at least in part on receiving the first sidelink communication, that the second identifier of the third UE is different from the identifier of the first UE;
resetting the timer based at least in part on identifying that the second identifier of the third UE is different from the identifier of the first UE; and
refraining from monitoring for the retransmission of the data based at least in part on resetting the timer.

7. The method of claim 6, wherein initiating the timer comprises:
initiating the timer at a time indicated by the configuration for performing the sidelink discontinuous reception procedure.

8. The method of claim 6, wherein initiating the timer comprises:
initiating the timer in response to detecting the control information in the first sidelink communication, wherein transmitting the feedback is based at least in part on initiating the timer.

9. The method of claim 6, further comprising:
receiving, from the second UE based at least in part on receiving the first sidelink control information indicating the configuration for performing the sidelink discontinuous reception procedure, a third sidelink communication comprising second control information comprising at least a portion of the second identifier of the third UE; and
refraining from decoding second data included in the third sidelink communication based at least in part on the portion of the second identifier of the third UE being different from the portion of the identifier of the first UE.

10. The method of claim 6, wherein the identifiers that identify UEs are media access control addresses identifying UEs in sidelink communications.

11. An apparatus for wireless communication at a first user equipment (UE), comprising:
a processor;
memory coupled with the processor; and
instructions stored in the memory and executable by the processor to cause the apparatus to:
receive first sidelink control information indicating a configuration for performing a sidelink discontinuous reception procedure that is associated with a sidelink resource reservation procedure, wherein the configuration indicates a duration of a timer associated with an active duration for the first UE to receive sidelink retransmissions during the sidelink discontinuous reception procedure;

receive second sidelink control information indicating an explicit indication of an initiation time of the timer, wherein the explicit indication of the initiation time comprises an explicit indication of a quantity of slots starting at a first slot of resources associated with a second sidelink communication and extending prior to the first slot of resources associated with the second sidelink communication;

receive, from a second UE, a first sidelink communication comprising data based at least in part on receiving the first sidelink control information indicating the configuration for performing the sidelink discontinuous reception procedure;

transmit, to the second UE, feedback requesting a retransmission of the data based at least in part on receiving the first sidelink communication;

initiate the timer at the initiation time in response to transmitting the feedback based at least in part on the explicit indication of the initiation time, wherein the second sidelink communication comprises the retransmission of the data; and receive, during the resources associated with the second sidelink communication and based at least in part on initiating the timer prior to the resources associated with the second sidelink communication, the second sidelink communication comprising the retransmission of the data, the second sidelink communication received via resources associated with the sidelink resource reservation procedure.

12. The apparatus of claim 11, wherein the initiation time is indicated by the configuration for performing the sidelink discontinuous reception procedure and is based at least in part on the sidelink resource reservation procedure.

13. The apparatus of claim 11, wherein the initiation time is indicated by the second sidelink control information associated with a sidelink communication.

14. The apparatus of claim 11, wherein the first sidelink communication comprises control information indicating the resources associated with the sidelink resource reservation procedure for receiving the second sidelink communication.

15. The apparatus of claim 11, wherein the instructions to transmit the feedback are executable by the processor to cause the apparatus to:
transmit a hybrid automatic repeat request requesting the retransmission of the data based at least in part on failing to decode the data in the first sidelink communication.

16. An apparatus for wireless communication at a first user equipment (UE), comprising:
a processor;
memory coupled with the processor; and
instructions stored in the memory and executable by the processor to cause the apparatus to:
receive first sidelink control information indicating a configuration for performing a sidelink discontinuous reception procedure that is associated with receiving identifiers that identify UEs in sidelink communications, wherein the configuration indicates a duration of a timer associated with an active duration for the first UE to receive sidelink retransmissions;

receive, from a second UE based at least in part on receiving the first sidelink control information indicating the configuration for performing the sidelink discontinuous reception procedure, a first sidelink communication comprising control information comprising at least a portion of a second identifier of a third UE that is different from an identifier of the first UE and data comprising the second identifier of the third UE;

transmit, to the second UE, feedback requesting a retransmission of the data based at least in part on receiving the first sidelink communication and in accordance with the data comprising the identifier of the first UE;

initiate the timer based at least in part on receiving the first sidelink communication;

identify, based at least in part on receiving the first sidelink communication, that the second identifier of the third UE is different from the identifier of the first UE;

reset the timer based at least in part on identifying that the second identifier of the third UE is different from the identifier of the first UE; and refrain from monitoring for the retransmission of the data based at least in part on resetting the timer.

17. The apparatus of claim 16, wherein the instructions to initiate the timer are executable by the processor to cause the apparatus to:
initiate the timer at a time indicated by the configuration for performing the sidelink discontinuous reception procedure.

18. The apparatus of claim 16, wherein the instructions to initiate the timer are executable by the processor to cause the apparatus to:
initiate the timer in response to detecting the control information in the first sidelink communication, wherein transmitting the feedback is based at least in part on initiating the timer.

19. The apparatus of claim 16, wherein the instructions are further executable by the processor to cause the apparatus to:
receive, from the second UE based at least in part on receiving the first sidelink control information indicating the configuration for performing the sidelink discontinuous reception procedure, a third sidelink communication comprising second control information comprising at least a portion of the second identifier of the third UE; and
refrain from decoding second data included in the third sidelink communication based at least in part on the portion of the second identifier of the third UE being different from the portion of the identifier of the first UE.

20. The apparatus of claim 16, wherein:
the identifiers that identify UEs are media access control addresses identifying UEs in sidelink communications.

* * * * *